(12) United States Patent
Thompson

(10) Patent No.: US 10,408,345 B2
(45) Date of Patent: Sep. 10, 2019

(54) SHIFTING APPARATUS

(71) Applicant: QINETIQ LIMITED, Hampshire (GB)

(72) Inventor: Robert William Thompson, Worcestershire (GB)

(73) Assignee: QINETIQ LIMITED, Hampshire (GB)

( * ) Notice: Subject to any disclaimer, the term of this patent is extended or adjusted under 35 U.S.C. 154(b) by 59 days.

(21) Appl. No.: 15/741,746

(22) PCT Filed: Jul. 12, 2016

(86) PCT No.: PCT/EP2016/066555
§ 371 (c)(1),
(2) Date: Jan. 3, 2018

(87) PCT Pub. No.: WO2017/016869
PCT Pub. Date: Feb. 2, 2017

(65) Prior Publication Data
US 2018/0195608 A1 Jul. 12, 2018

(30) Foreign Application Priority Data

Jul. 24, 2015 (GB) .................................. 1513095.8

(51) Int. Cl.
*F16H 63/18* (2006.01)
*F16H 25/12* (2006.01)
(Continued)

(52) U.S. Cl.
CPC ............. *F16H 63/18* (2013.01); *F16H 25/12* (2013.01); *F16H 63/32* (2013.01);
(Continued)

(58) Field of Classification Search
CPC ......... F16H 2063/325; F16H 2063/321; F16H 2063/3093; F16H 63/32; F16H 63/18
See application file for complete search history.

(56) References Cited

U.S. PATENT DOCUMENTS 2,577,019 A * 12/1951 Kesterton ............... F16H 63/18
74/334
3,043,413 A * 7/1962 McAfee .................. F16H 63/32
192/48.91
(Continued)

FOREIGN PATENT DOCUMENTS

DE 19543645 A1 5/1997
DE 10225467 A1 12/2003
(Continued)

OTHER PUBLICATIONS

International Search Report for PCT Patent App. No. PCT/EP2016/066555 (dated Sep. 1, 2016).
(Continued)

*Primary Examiner* — William Kelleher
*Assistant Examiner* — Gregory T Prather
(74) *Attorney, Agent, or Firm* — Kenealy Vaidya LLP

(57) ABSTRACT

A shifting apparatus including a shaft extending along an axis, and at least one shifting feature, each of the at least one shifting feature including: a multi-part pin having first and second parts arranged to rotate relative to each other that extend through respective slots extending along the shaft; a drum arranged around the shaft and having channels extending along the length thereof wherein the first and second parts of the multi-part pin are respectively received for enabling torque transfer to the drum when the shaft is rotated, the drum also defining a track at least partially around its outer surface; a biasing mechanism for urging the drum towards a rest position along the length of the shaft; and a drive member selector member provided in operative relation to the track. The drive member selector member can be controlled to selectively engage a drive member.

20 Claims, 16 Drawing Sheets

(51) Int. Cl.
*F16H 63/32* (2006.01)
*F16H 63/30* (2006.01)

(52) U.S. Cl.
CPC ........... *F16H 2063/3093* (2013.01); *F16H 2063/321* (2013.01); *F16H 2063/325* (2013.01)

(56) References Cited

U.S. PATENT DOCUMENTS

| | | | | |
|---|---|---|---|---|
| 4,716,779 | A * | 1/1988 | Heinzelmann | F16H 63/30 74/473.1 |
| 5,740,695 | A * | 4/1998 | Janson | F16H 63/32 74/337.5 |
| 2004/0108168 | A1 * | 6/2004 | Bathe | F16H 57/042 184/6.12 |
| 2006/0162487 | A1 * | 7/2006 | Chappelear | B62M 11/00 74/567 |
| 2007/0000340 | A1 | 1/2007 | Kapp et al. | |
| 2010/0101345 | A1 * | 4/2010 | Moore | F16H 3/10 74/339 |
| 2014/0076086 | A1 * | 3/2014 | Wascheul | F16H 63/3023 74/473.11 |
| 2014/0238758 | A1 * | 8/2014 | Barth | B60K 6/48 180/65.25 |
| 2014/0338484 | A1 * | 11/2014 | Maki | F16H 61/68 74/337.5 |
| 2015/0006042 | A1 * | 1/2015 | Hotei | F16H 63/18 701/51 |
| 2015/0211633 | A1 * | 7/2015 | Thompson | F16H 63/18 74/362 |
| 2016/0091089 | A1 * | 3/2016 | Nakamura | F16H 63/16 74/337.5 |
| 2018/0135751 | A1 * | 5/2018 | Maki | F16D 21/00 |
| 2018/0170168 | A1 * | 6/2018 | Nilsson | B60H 1/3222 |
| 2018/0209538 | A1 * | 7/2018 | Makita | F16H 61/32 |
| 2018/0216708 | A1 * | 8/2018 | Saitoh | F16H 63/30 |

FOREIGN PATENT DOCUMENTS

| | | |
|---|---|---|
| JP | 2015-081634 A | 4/2015 |
| WO | WO2014/049317 A1 | 4/2014 |

OTHER PUBLICATIONS

Written Opinion for PCT Patent App. No. PCT/EP2016/066555 (dated Sep. 1, 2016).

Search Report for Great Britain Patent App. No. 1513095.8 (dated Jan. 19, 2016).

* cited by examiner

SHIFTING APPARATUS

CROSS REFERENCE TO RELATED APPLICATION(S)

This application is a national phase filing under 35 C.F.R. § 371 of and claims priority to PCT Patent Application No. PCT/EP2016/066555, filed on Jul. 12, 2016, which claims the priority benefit under 35 U.S.C. § 119 of British Patent Application No. 1513095.8, filed on Jul. 24, 2015, the contents of each of which are hereby incorporated in their entireties by reference.

BACKGROUND

Some embodiments relate to shifting apparatus for selectively engaging a drive member, for instance to implement a gear ratio change inside a gearbox.

WO2014/049317 A1 describes a gearbox which is clutchless in the sense that once a car having such a gearbox is in motion, different gear ratios can be selected without disengaging a clutch. The passage in WO2014/049317 A1 between page 12, line 17 and page 15, line 32 describes a shifting mechanism for implementing gear ratio changes in such a gearbox. It has been found that in practice a greater torque than expected is needed to rotate a shift shaft to implement gear ratio changes. In some cases where a steep angle on the ramp in the shift barrel is used the mechanism can jam and so prevent the mechanism functioning correctly. Referring to FIG. 8 herein (a reproduction of FIG. 8 in WO2014/049317 A1) this has been attributed mainly to friction between the pins 21 and edges of the slots 22 in the shift shaft 9 through which they extend.

More specifically, sometimes a selector drum of the kind denoted 11 in FIG. 8 is urged along the length of the shift shaft 9. This occurs for instance in the situations mentioned in WO2014/049317 A1 between page 16, line 31 and page 17, line 1 and also between page 18, lines 25 to 32. In the first situation for example, to implement an upshift in gear ratio both torque and an axial force are exerted on a selector drum 11*b* associated with the lower gear, thereby causing it to move along the shift shaft 9 until the higher gear is engaged. As the selector drum 11*b* is being forced along the shift shaft 9 the aforementioned pins 21 are dragged against edges of the slots 22 in the shift shaft 9. Sliding friction thus provides that a larger torque than expected is required to be exerted on the shift shaft 9 to cause the selector drum 11*b* to be forced along its length during an upshift in gear ratio. A similar problem with friction occurs during a downshift whilst positive driving torque is present.

SUMMARY

Aspects of some embodiments are conceived to address the foregoing.

Some embodiments are directed to a shifting apparatus that includes a shaft extending along an axis and at least one shifting feature, each of the at least one shifting feature including:
  a multi-part pin having first and second parts arranged to rotate relative to each other that extend through respective slots extending along the shaft;
  a drum arranged around the shaft and having channels extending along the length thereof in which the first and second parts of the multi-part pin are respectively received for enabling torque to be transferred to the drum when the shaft is rotated, the drum also defining a track at least partially around its outer surface;
  a biasing mechanism for urging the drum towards a rest position along the length of the shaft; and
  a drive member selector member provided in operative relation to the track, wherein the drive member selector member can be controlled to selectively engage a drive member, for transferring torque thereto in use, by rotating the shaft.

The apparatus may be configured such that when torque is transferred to the drum from the shaft and an axial force is applied to the drum that overcomes the biasing mechanism the drum moves along the shaft by riding on the multi-part pin.

The apparatus may be configured such that when torque is transferred to the drum from the shaft each of the first and second parts of the multi-part pin are pinched between an edge of the slot through which the respective part extends and a surface of the channel into which the respective part extends.

The apparatus may be configured such that as the drum moves along the shaft each of the first and second parts of the multi-part pin are in shear with an edge of the slot through which the respective part extends and a surface of the channel into which the respective part extends.

The apparatus may be configured such that the first and second parts of the multi-part pin rotate in opposite directions as the drum moves along the shaft.

The apparatus may be configured such that the shaft can be rotated by a predetermined amount relative to the drum without causing torque to be transferred to the drum.

A clearance may exist between sides of the slots through which, and sides of the channels into which, the first and second parts of the multi-part pin respectively extend.

One of the first and second parts of the multi-part pin may be received inside the other.

The first and second parts of the multi-part pin may be coupled by at least one additional multi-part pin feature.

The multi-part pin may include a third part about which the first and second parts can rotate.

The biasing mechanism may include two pins urged into recesses on opposite sides of the drum, and wherein the apparatus may be configured such that torque is not transferred to the drum by such pins when the shaft is rotated.

Each of the pins may be urged by a respective resiliently biased member which partially extends around the pin.

The resiliently biased members extending around the respective pins may maintain the multi-part pin substantially perpendicular with the axis extending along the length of the shaft when the drum is located in the rest position.

The pins may be arranged at substantially 90 degrees relative to the multi-part pin.

Some embodiments are directed to a gearbox that includes the shifting apparatus according to any heretofore mentioned arrangement.

BRIEF DESCRIPTION OF THE DRAWINGS

Some embodiments will now be described by way of non-limiting example with reference to the accompanying drawings, in which.

DETAILED DESCRIPTION OF EXEMPLARY EMBODIMENTS

Some embodiments are enhancements or improvements to the gearbox described in WO2014/049317 A1. For completeness of the present description, an outline of this known gearbox is provided and after that an explanation is given of an improved shifting mechanism for implementing gear ratio shifts.

Figure 1:
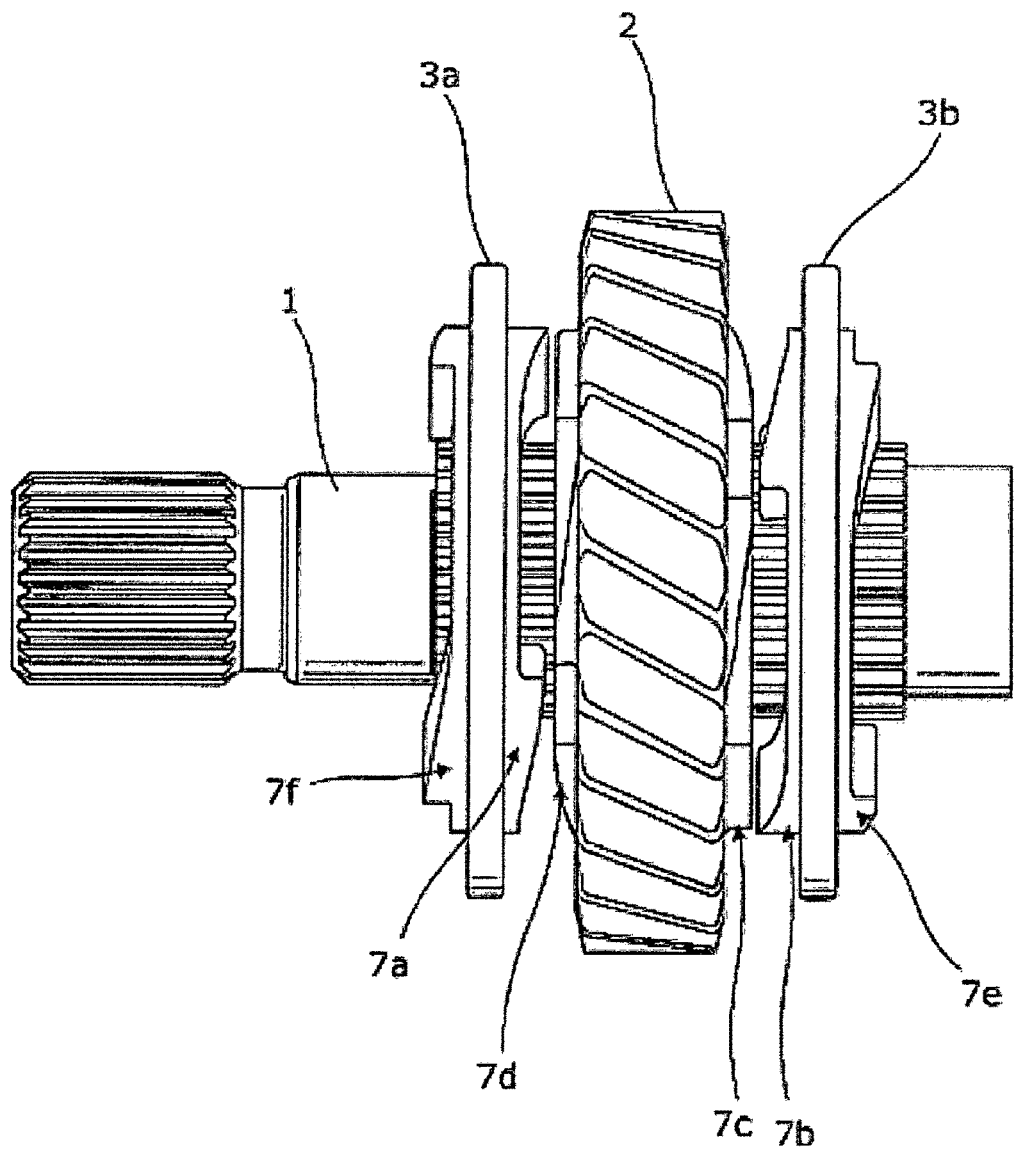
FIG. 1 shows the assembly of the main components of an arrangement according to an aspect of the present disclosure in a fully disengaged state.

FIG. 1 shows the assembly of the main components of an aspect of the present disclosure in a fully disengaged state. The shaft 1 passes through a first selector member, herein referred to as a 'dog hub' 3a, a drive member in the form of a gear 2 and a second dog hub 3b. The gear 2 is mounted on the shaft by a low friction bearing (not visible), being, in this arrangement, a combination of plain thrust washers and a needle roller bearing, so that it is axially and radially located on the shaft 1 but free to rotate relative to the shaft 1.

In this arrangement the drive member is a gear 2, although in other arrangements the drive member may be any part of a drive mechanism which is required to be selectively rotatively engaged to a shaft, for example a roller chain sprocket or a belt drive pulley.

Figure 2:
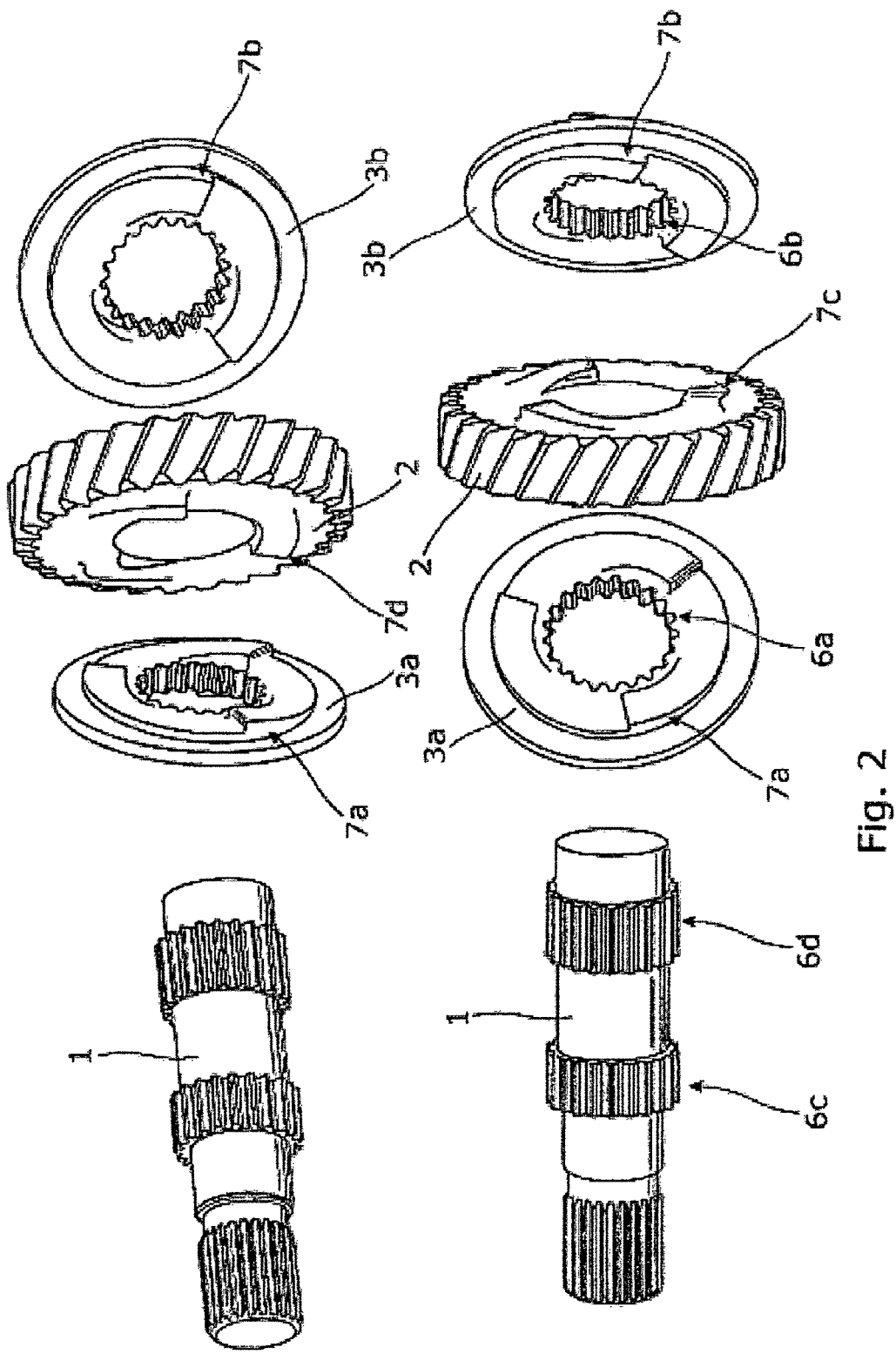
FIG. 2 is an exploded view of the main components of the arrangement of FIG. 1.
Figure 3:
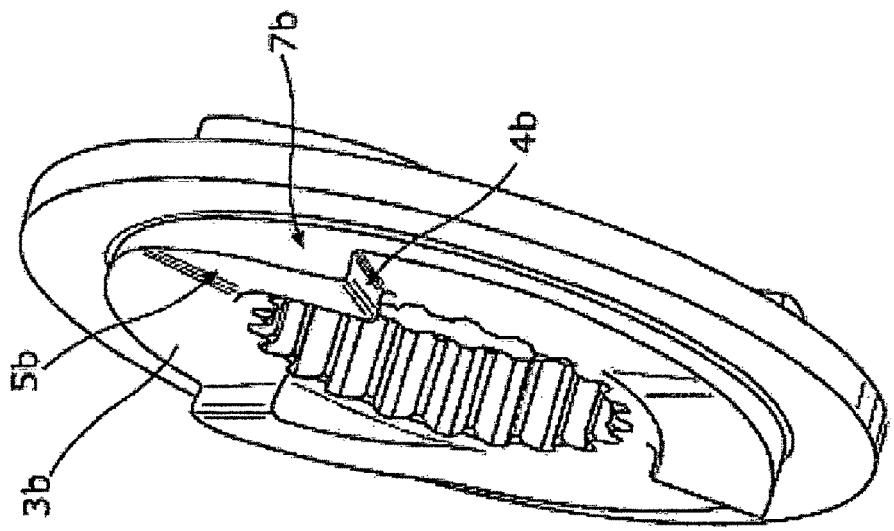
FIG. 3 shows a detail view of the dog features on a dog hub 3b and the corresponding dog features on the gear 2.
Figure 3:
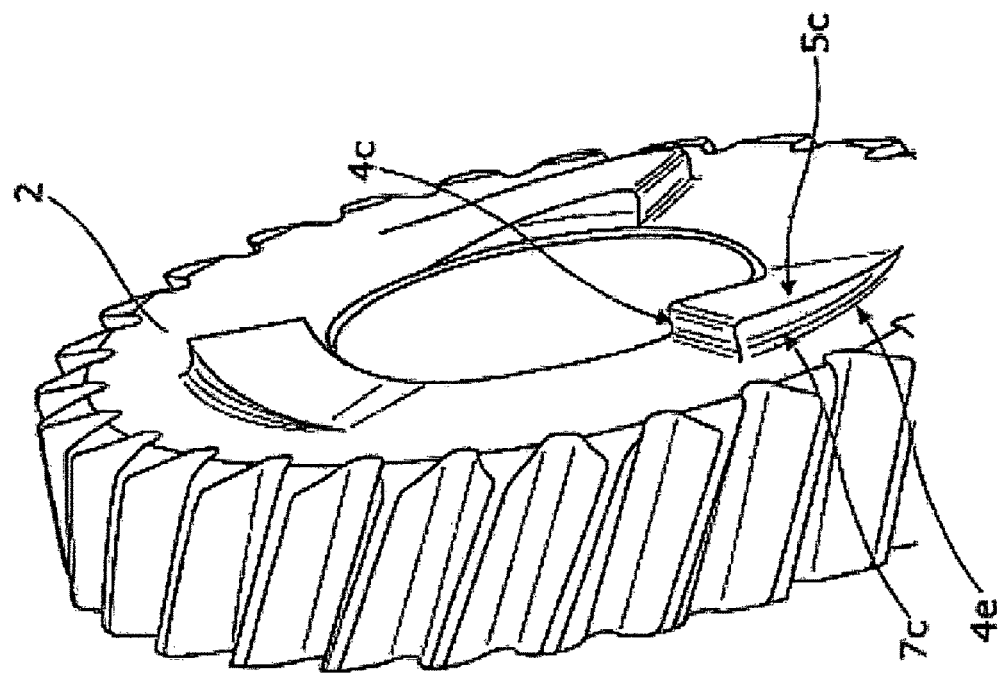

As can be seen with reference to FIGS. 1 to 3 in particular, dog hubs 3 are substantially annular having two faces and a device for engaging with the shaft 1, in this example, a toothed inner ring 6a, 6b. They also include a plurality (in this example, 3) of projections or engagement 'dog' features 7a, 7b, 7f, 7e, arranged on each face thereof. The gear 2 is also annular, including a toothed outer surface and two opposed faces. The gear further includes a plurality (in this example 3 on each face) of engagement 'dog' features 7c, 7d. The dog features 7 of the hubs 3b are shaped to engage the dog features 7 of the gear 2, as will be described in greater detail below.

In the disengaged state of FIG. 1, the two dog hubs 3a and 3b are axially displaced away from the gear 2 so that the dog features 7a, 7b on the hubs are disengaged from the corresponding dog features 7c, 7d on the gear 2. It will be noted that the dog features 7e, and 7f on the second face (as illustrated, the outer faces) of two dog hubs 3a, 3b do not engage with the gear 2 shown in FIGS. 1-5, but are provided to allow for engagement with other gears which may be mounted on the main shaft (see FIG. 6 onwards).

FIG. 2 is "an exploded view" of the main components of an aspect of the present disclosure, in which the lower half of the Fig. shows the same components as the upper half of the Fig. but at a different viewing angle to reveal the dog features 7 on the second side of the gear 2. In the upper half of FIG. 2 the dog features 7a on the dog hub 3a and the corresponding dog features 7d on one side of the gear 2 are visible. In the lower half of FIG. 2 the dog features 7b on the dog hub 3b and the corresponding dog features 7c on the other side of the gear 2 are visible.

In this arrangement as illustrated in the accompanying illustrations, each face of each dog hub 3 and each face of each gear 2 have three such projections provided by the dog features 7 substantially evenly distributed around the axis of the shaft. However, the use of any number of similar dog features 7 per face is possible. For example if higher load capacity was required more dog features 7 could be used, or for simplicity, or to achieve engagement with higher speed difference, fewer dog features 7 could be used. However, providing three dog features 7 per face provides for substantially even load sharing between dog features 7 and gives a self centring action when the dog features 7 are transmitting torque. If greater than three dog features 7 are used, high accuracy of manufacture is required to ensure that any errors in dog feature position are less than the deflection of the dog features 7 under load if load sharing over more than three dog features 7 is to be achieved. Also the use of three dog features 7 per face provides a large angular gap between features to allow positive engagement with a high relative speed between a dog hub 3 and gear 2.

The shaft 1 includes a plurality of male spline teeth portions 6c, 6d (the number of which corresponds to the number of dog hubs 3 in the assembly), and the inner ring of the dog hubs 3 carry corresponding female spline teeth 6a, 6b.

These mating splines 6c, 6d and 6a, 6b are toleranced to engage with a clearance fit. The male spline teeth are wider (i.e. extend further axially along the shaft 1) than the female spline teeth such that, once arranged on the shaft 1, the dog hubs 3a, 3b are radially and rotatively connected to the shaft 1 when aligned with the male spline teeth 6c, 6d but are free to move axially, while maintaining this connection to the shaft 1. This allows the dog features 7a, 7b of the dog hubs 3a, 3b to move in and out of engagement with the dog features 7c, 7d of the gear 2 while still being driven by the shaft 1.

FIG. 3 shows a detail view of the dog features 7a, 7b on a dog hub 3 and the corresponding dog features 7c, 7d on the gear 2. Each of the dog features 7a-d can include or can consist of a ramp-like block projecting above the side face of the gear 2 or dog hub 3. Each dog feature 7a-d rises from a base 4e which is in the same plane as the face of the dog hub 3 and includes a sloping surface 5b, 5c and a 'mating' or contacting surface 4c, 4b which is angled away from the axis of the shaft 1 to provide positive engagement, or a physical interlock, between a feature on a hub 3 and a feature on the gear 2 when one is rotatively driving the other.

Furthermore, taking the example of a single hub, when the dog hub 3b is moved towards the gear 2 by action of a shifting mechanism (described herein below), the leading edges 4b of the dog features 7b of the dog hub 3b will become engaged with the leading edges 4c of the dog features 7c of the gear 2 and provide a device of transmitting torque between the two components. The contact forces between the mating faces 4b, 4c, resulting from the transmission of torque will tend (because of the angle of the faces 4b, 4c) to pull the dog hub 3b toward the gear 2, so ensuring there is no tendency for the mechanism to fall out of engagement when transmitting torque.

The sloping surfaces 5b, 5c of the dog features 7b, 7c provide a trailing edge which ramps at a relatively shallow angle. When there is relative rotation between the dog hub 3b and the gear 2 in the other sense, the shallow sloping surface 5b, 5c will easily ride up each other so forcing the dog hub 3b away from the gear 2 and so disengaging any connection between the two components. This 'ramped' form of the dog features 7a-f therefore provides for positive engagement and transmission of torque in one sense of relative rotation and for disengagement of the dog features 7a-f and no transmission of torque in the other sense of relative rotation.

It should be noted that the dog features 7 on one side of the gear 2 and the corresponding dog features 7 on the dog hub 3a, as visible in the upper half of FIG. 2, are adapted to give positive engagement and driving connection between the dog hub 3a and the gear 2 in one sense of relative rotation and the dog features 7 on the other side of the gear 2 and the corresponding dog features 7 on the dog hub 3b are adapted to give positive engagement and driving connection in the other sense of relative rotation. Therefore when both dog hubs 3 are moved toward the gear 2 by action of a shifting mechanism (described later), there exists positive driving engagement in both senses of relative rotation between the gear 2 and the dog hubs 3a, 3b, and since both the dog hubs 3a, 3b are connected to the shaft by splines, to the shaft 1.

Figure 4:
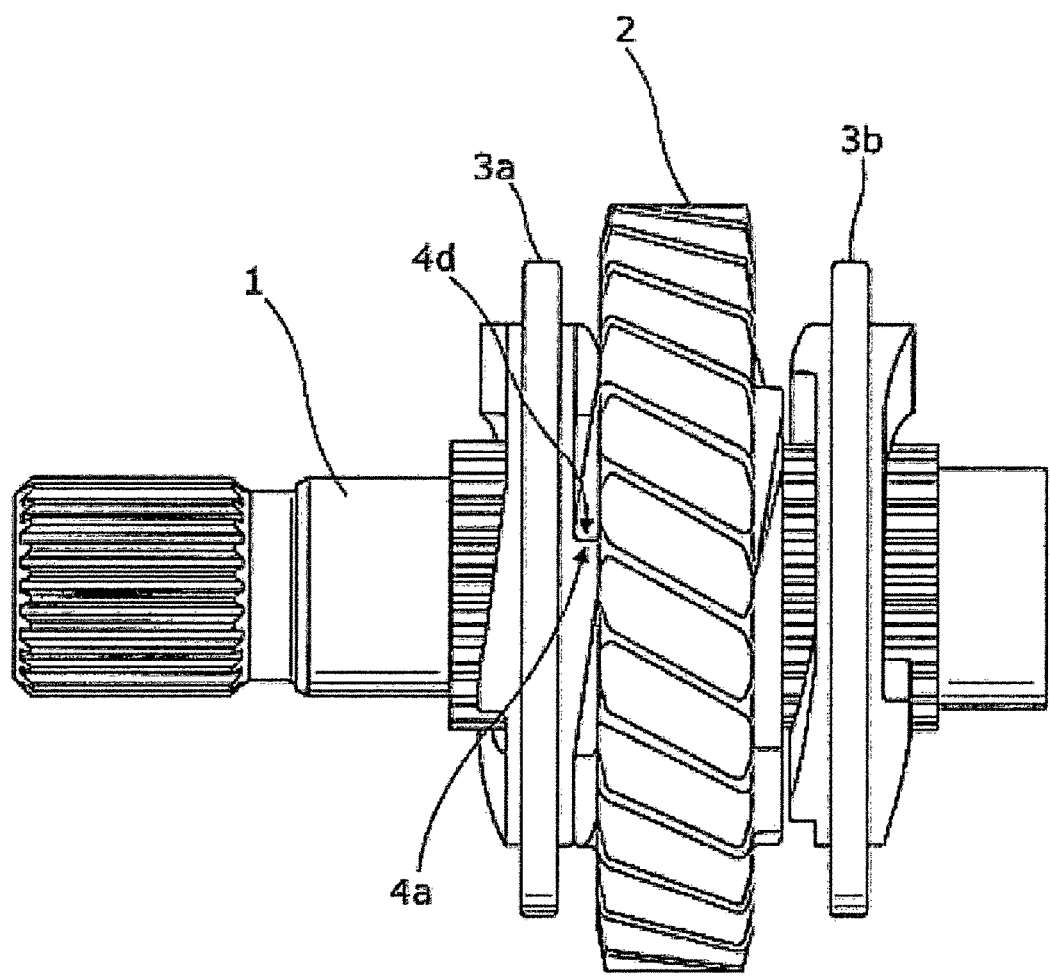
FIG. 4 shows the assembly of the main components of the arrangement of FIG. 1 in a semi engaged state.

FIG. 4 shows the assembly of the main components of the heretofore described aspect of the present disclosure in a 'semi engaged' state. Dog hub 3a is in contact with gear 2 and the mating surfaces 4a, 4d of the dog features 7 are in contact with each other. Dog hub 3b is axially displaced away from the gear 2 so that there is a clearance between the tips of the dog feature projections. In this state therefore the gear 2 is rotatively connected to the shaft 1 for relative rotation (e.g. positive torque/forward drive) in one sense but not in the other sense (e.g. negative torque/reverse drive).

Figure 5:
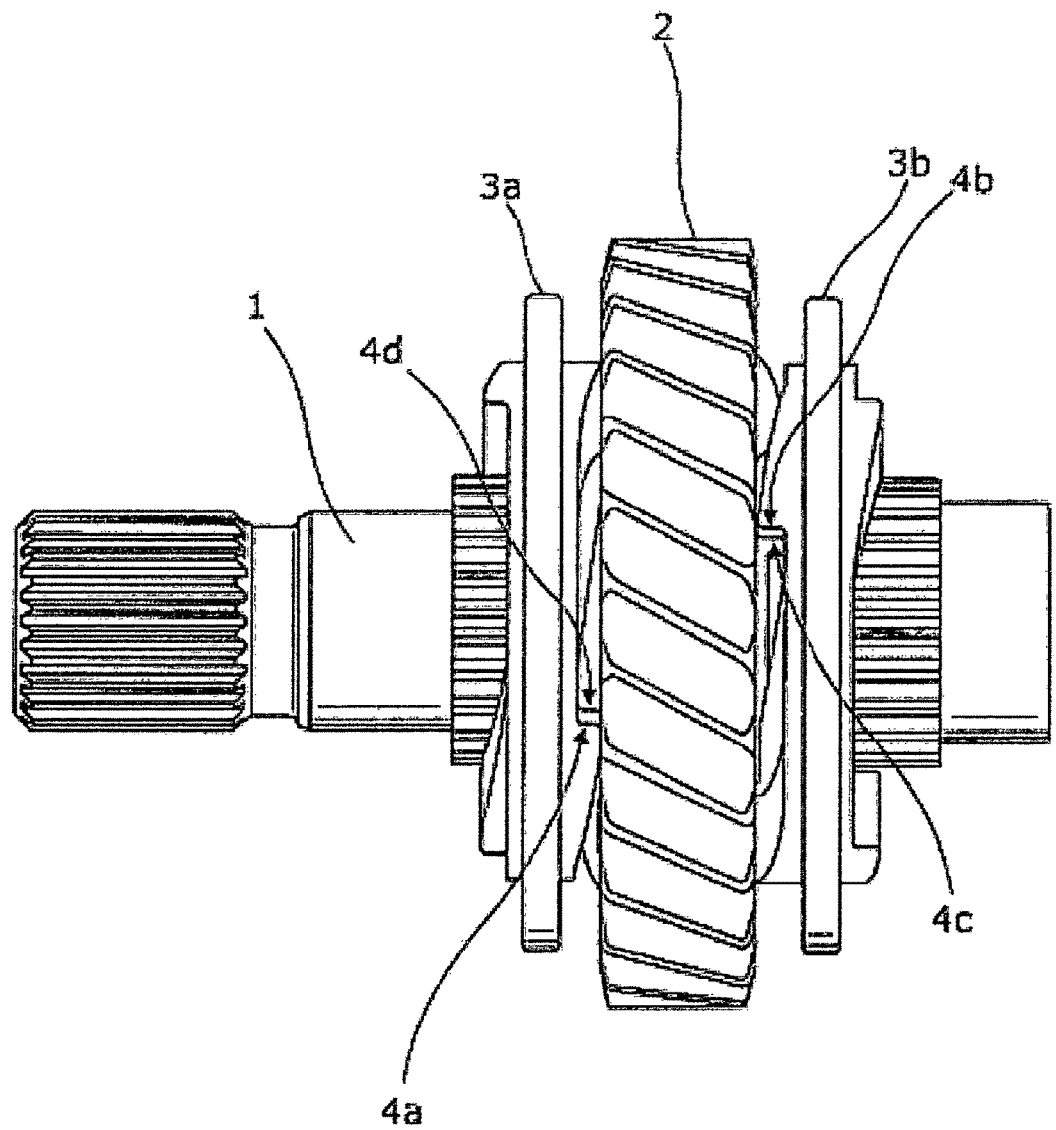
FIG. 5 shows the assembly of the main components of the arrangement of FIG. 1 in a fully engaged state.

FIG. 5 shows the assembly of the main components of the heretofore described aspect of the present disclosure in a fully engaged state. Both dog hubs 3a, 3b are in contact with the gear 2. The leading edges of the dog features 7a, 7b on the dog hubs 3 are in engagement with the corresponding leading edges of dog features 7c, 7d on the gear 2. In this state therefore the gear 2 is rotatively connected to the shaft 1 for relative rotation and drive in both senses. It should be noted that the assembly of the dog hubs 3a, 3b onto the shaft 1 is chosen so that in this state of full engagement only a small tangential clearance exists between the leading edges of the dog features 7. This small tangential clearance ensures that only a small amount of backlash is present between the gear 2 and the shaft 1 in this fully engaged state. For road vehicles, especially passenger vehicles, low backlash is desirable for passenger comfort, to minimise torsional shocks in the driveline each time a torque reversal occurs, for example when the driver lifts off the accelerator pedal. A minimal amount of clearance is provided between the dogs to allow for engagement of the dog features 7a-f having angled leading edges (as shown in this arrangement) to provide positive engagement, and to allow for manufacturing tolerances.

Figure 6:
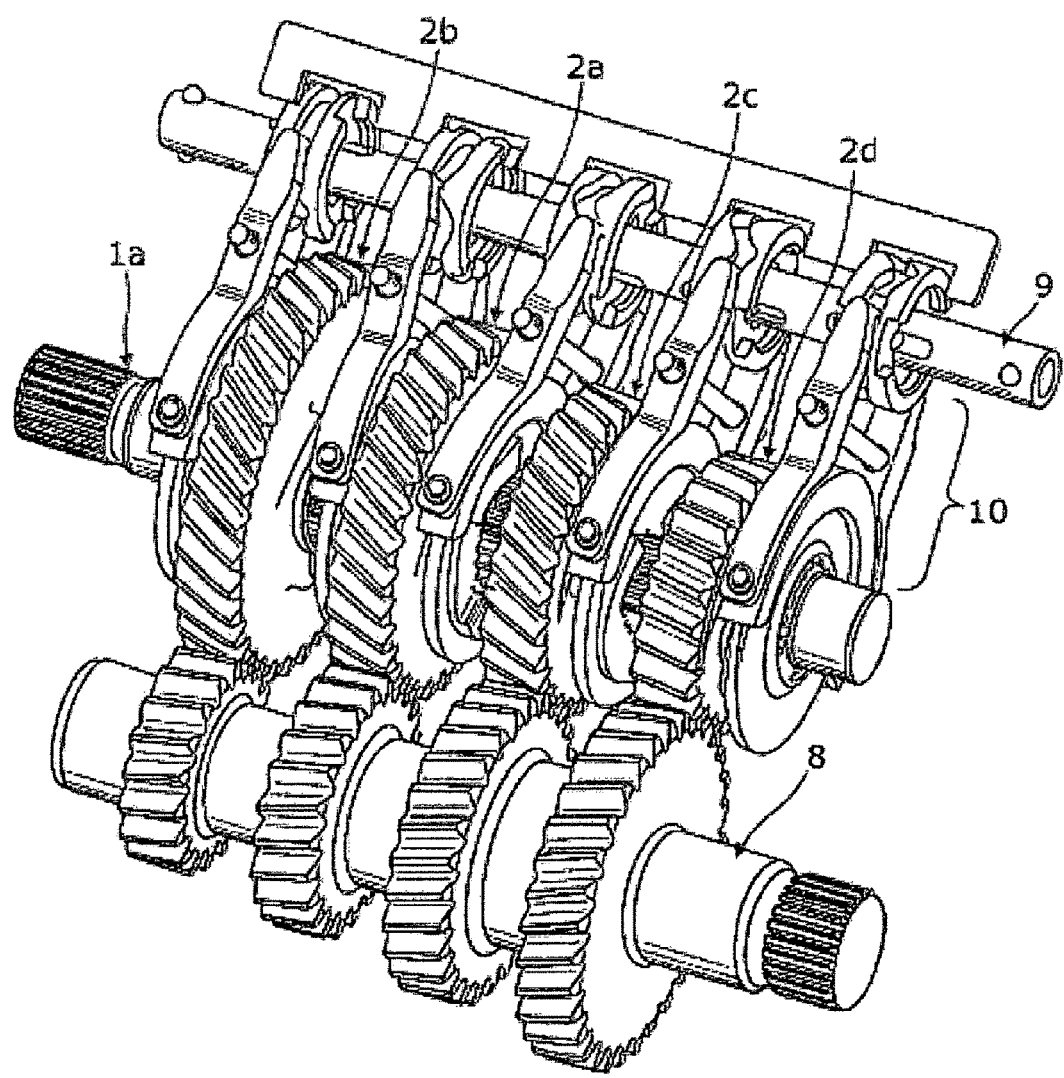
FIG. 6 is an overall view of a 4-ratio gearbox including a related art shifting mechanism.

FIG. 6 is an overall view of a 4-ratio gearbox including a shifting mechanism. The main shaft is carries four gears 2a, 2b, 2c, 2d, of varying diameters each meshing with a lay gear 8, the lay gear 8 having four meshing gears 2 formed along its length. In this arrangement, the main shaft 1a is the input and the lay gear 8 is the output. When one of the gears 2a-d is selected, by rotatively connecting it to the main shaft using the dog hubs 3, there is a driving connection between the input shaft is and the lay gear 8, the relative speeds of the input shaft is to the lay gear 8 being the ratio of the numbers of teeth on the selected gear 2 and the meshing gear on the lay gear 8. The diameters and tooth numbers on each of the gears are chosen to achieve substantially similar ratio differences between adjacent gear pairs so providing for similar step changes in input speed as shifts are made.

The shifting mechanism includes a shift shaft 9 including a number of shifting features 10. In this four speed example embodiment there are five such shifting features, each one including a dog hub 3. The dog hubs 3 between each one of the gears 2 on the main shaft is have dog features 7 formed on both sides, as shown in FIG. 1, to engage with either of the adjacent gears 2. The dog hubs 3 on each end of the main shaft is shown in this illustration have dog features 7 on only one side to engage with the adjacent gear 2. However, for convenience, to minimise the number of different components used in a given gearbox, and to guard against incorrect assembly, the same 'two sided' dog hub 3 as used between gears 2 could be used at the end of the main shaft 1a, with its outer dog feature 7 being redundant.

The main shaft 1a, the lay gear 8 and the shift shaft 9 are supported in a casing on suitable bearings, one bearing at each end of each shaft. The casing and bearings are not shown in this illustration but suitable bearings would be familiar to the person with ordinary skill in the art.

Figure 7:
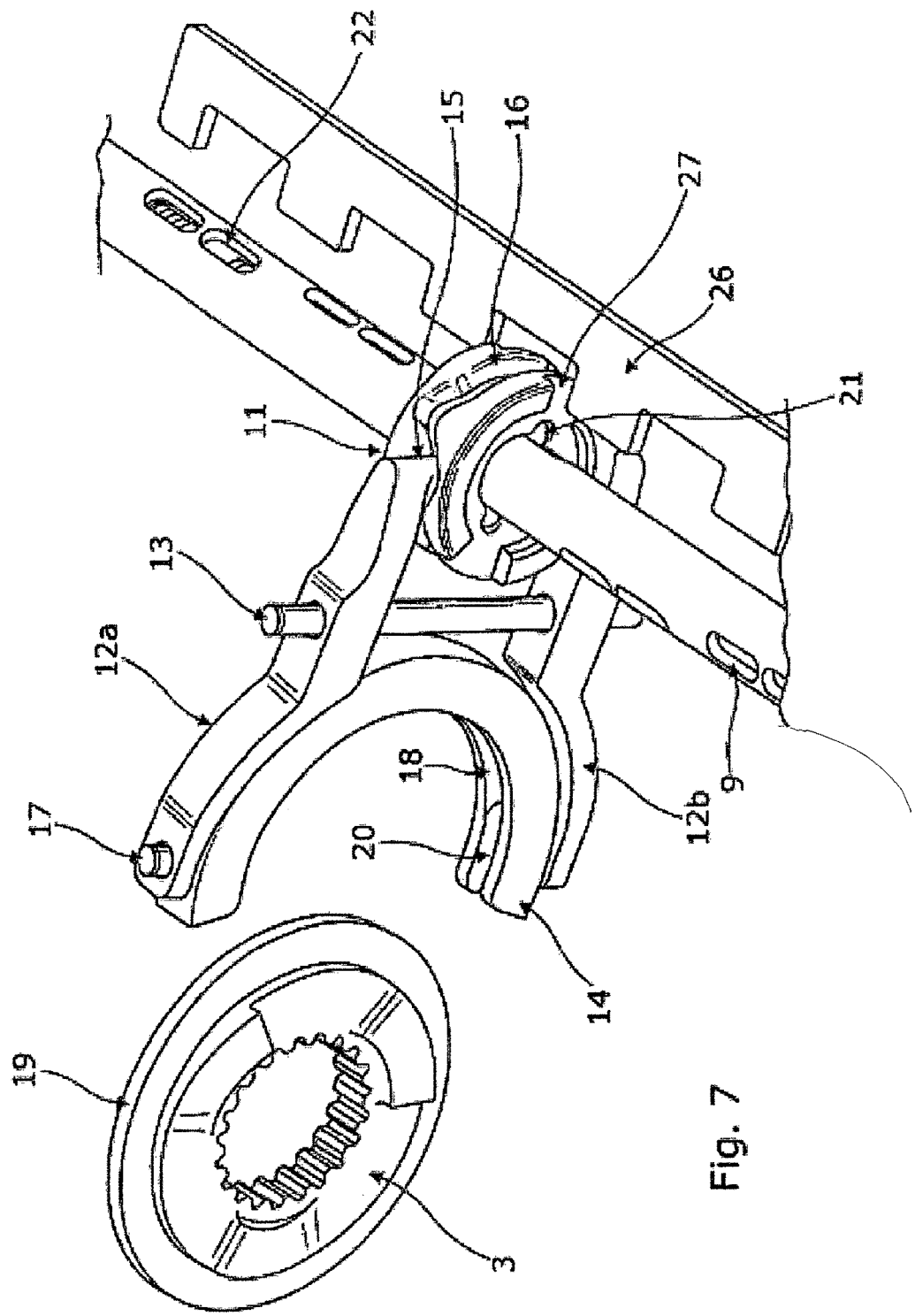
FIG. 7 shows some components of the shifting mechanism of FIG. 6 with one dog hub shown in an exploded view for reference.

FIG. 7 shows some components of the shifting mechanism shown in an exploded view. A selector drum 11 is mounted on the shift shaft 9. Shift arms 12a, 12b are provided, one mounted above and one mounted below each selector drum 11, and located into the gearbox case (not illustrated) by a pivot pin 13. The pivot pin 13 is located in holes in the gearbox case so as to be stationary with the case. On one end of each pivot arm 12a, 12b there is a pin 15, which engages with a track 16 cut in the outer diameter of the selector drum 11 (see also FIG. 9 for views of the tracks 16). As can perhaps be better appreciated in the assembled shifting mechanism shown in FIG. 9, the axial position of the track 16 varies around the circumference of the drum 11. As the drum 11, is rotated with the shift shaft 9, the pin 15 therefore is moved axially and the shift arms 12a-b, pivot around the pivot pin 13. On the other end of the shift arms 12a, 12b is mounted the shift thrust ring 14. Pins 17 formed on the outside of the shift thrust ring 14 fit through holes in the ends of the shift arms 12a, 12b so that the shift thrust ring 14 can pivot on the end of the arms 12a, 12b. The shift thrust ring 14 is formed to have a groove 18 around its inside diameter which fits over a ridge 19 formed on the outside diameter of the dog hub 3. When the shift thrust ring 14 is fitted over the dog hub 3 there exists a small axial clearance between the inside of the groove 18 and the profile of the ridge 19 so that the dog hub 3 can freely rotate inside the ring 14, but if the ring 14 is axially displaced the dog hub 3 is also axially displaced. Specifically, when the shift arms 12a, 12b pivot by the action of the selector drum 11 being rotated, the shift thrust ring 14 therefore is axially displaced and with it the dog hub 3.

In the arrangement illustrated, the gearbox is assumed to be partially filled with oil for cooling and lubrication of the gears and bearings. This oil therefore will provide lubrication between the inside of the groove 18 and the ridge 19 so forming a thrust bearing capable of displacing the dog hub 3 for the purpose of gear selection when the gearbox is rotating at high speed. As will be familiar to one of ordinary skill in the art, some of the inside surface of the groove 18 may be cut back to leave raised thrust pads to reduce the area of contact between the groove 18 and the ridge 19 to reduce friction and aid lubrication.

In other arrangements the thrust bearing between the shift thrust ring 14 and the dog hub 3 may be any other suitable form of thrust bearing, for example a needle roller thrust bearing, a ball bearing or a spherical roller bearing. As will be familiar to one of ordinary skill in the art, any such bearing is capable of causing an axial displacement of the dog hub 3.

Figure 8:
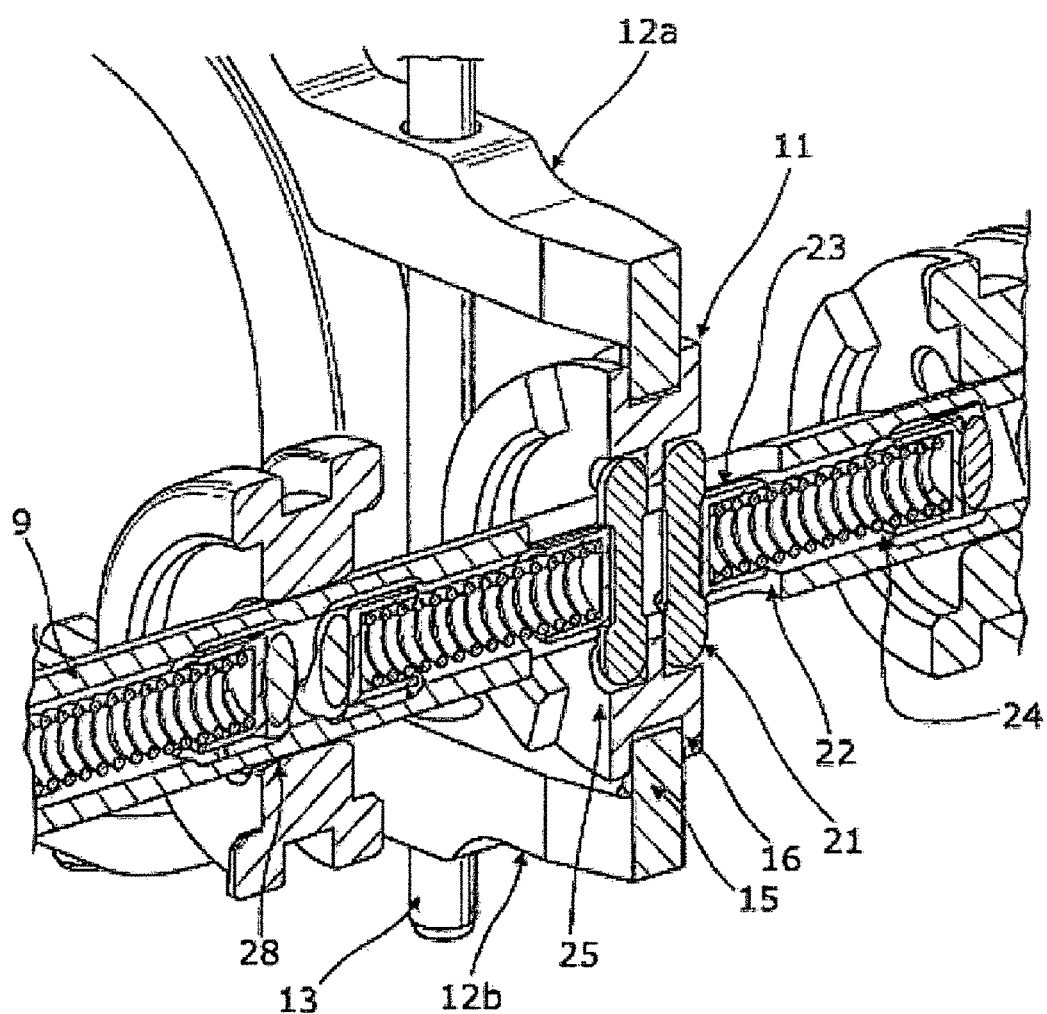
FIG. 8 is a section view through the axis of a shift shaft 9, showing a spring connection between the shift shaft and selector drum.

FIG. 8 is a section view through the axis of the shift shaft 9 revealing the spring connection between the shift shaft 9 and the selector drum 11. The shift shaft 9 includes a tube with a series of slots 22 (see also FIG. 9) which are cut through the tube wall. Pins 21, one each side of each selector drum 11, fit through the slots 22 and engage with cut out tracks 25 on each side of the selector drum 11. Springs 24 are fitted inside the shift shaft 9 between each selector drum 11 with spring cups 23 on each end of each spring 24, the spring cups 23 resting on the pins 21. The springs 24 are selected to be longer than the gap between each spring cup 23 so that they are partially compressed on assembly and so provide a defined preload to the pins 21. The middle portion of each pin 21, on which the spring cups 23 rest, is a smaller diameter so that there is a step each side of the spring cup 23 to retain the pin 21 in position in the shift shaft 9 even if the pin 21 is revealed by axial displacement of the selector drum 11. It should be noted that the gap between the ends of the slots 22 in the shift shaft 9 and the axial thickness of the material between the cut-out tracks 25 in the selector drum are substantially the same, so that preload on the pins 21 from the springs 24 holds the pins 21 in contact with the ends of the slots 22 and the selector drum 11 is positively located between the pins 21 along the axis of the shift shaft 9. The pins 21 passing through the slots 22 and into the cut-outs 25 in the selector drums 11 provide a rotary connection between the shift shaft 9 and the drums 11 but allow axial displacement within the length of the slot 22. If a force acts to push the sector drums 11 along the shift shaft 9 which exceeds the preload in the springs 24 then the pins 21 will move along the slot 22, further compressing the spring 24, allowing axial displacement of the selector drum 11 while maintaining rotary connection. The selector drums 11 therefore are positively located along the length of the shift shaft 9 so can provide positive control over the shift arms and the movement of the dog hubs 3 along the shaft 1, but if a load defined by the preload in the springs 24 is exceeded, then the selector drums 11 may be axially displaced along the shift shaft 9.

It should be noted that, in this example, each selector drum 11 is fitted over the shift shaft 9 with a clearance fit to allow axial displacement and additionally the internal bore 28 of the selector drum 11 is of a double conical form to allow for some misalignment of the drum 11 on the shaft 9. Additionally it should be noted that the two shift arms 12a and 12b in the example arrangement can pivot independently of one another. This provides for an amount of flexibility in the mechanism to allow for variation in the geometry of each component due to manufacturing tolerance and the like. The dog hub 3 is then allowed to contact the gear 2 without being overly constrained by the shifting mechanism. It may also be noted that the use of a selector drum 11 with two pins 15 engaging in its track, one directly opposite the other, ensures that the resulting forces from the shift arms 12 on the selector drum 11 act substantially at the centre line of the shaft 9 on the spring 24. This configuration therefore resists any tendency for the drum 11 to bind on the shift shaft 9 if it is axially displaced by the action of the dog features 7 on the dog hub 3 engaging with dog features 7 on the gear 2.

It may be noted, that, in this example, for cost effective manufacture by minimising the number of different components used and preventing incorrect assembly, each of the selector drums a fitted to the shift shaft 9 are identical components, and that their angular and axial positions are determined by the location of the various slots 22 cut through the shift shaft 9. Also the selector drums 11 are designed to be symmetrical so that they do not need to be installed in any particular orientation to function correctly. However, this need not be the case in all examples.

FIG. 7 shows a selector drum a fitted to the shift shaft 9. Adjacent to the drum is the gate 26. The gate 26 is fixed to the case of the gearbox (not shown), and has a series of slots through which pass the edges of each selector drum 11. There exists a clearance between the drums a and the slots in the gates 26 so that in normal operation the drums 11 rotate freely without contacting the gate 26. In the end faces of each drum a there are cut-outs 27 adjacent to the slot in the gate 26. At certain angular positions the cut-out 27 of a drum a aligns with the gate 26 so that if the selector drum 11 is displaced axially along the shift shaft 9 then the cut-out 27 engages with the gate 26 and the rotation of the drum 11, and the whole shift shaft 9, is limited to the angular extent of the cut-out. This provides a mechanism to block certain combinations of dog hub 3 movement which could otherwise damage the gearbox as now described. In other angular positions, the cut-out 27 does not align with the gate 26 and so the axial movement of the drum 11 is limited by the gate 26.

It should be noted that the cut-outs 27 in the selector drum 11 are aligned with the gate 26 when the pin 15 on the shift arms 12 are in the portion of the track 16 which cause axial displacement of the pin and so moves the shift arms 12 and moves the dog hubs 3 into engagement with the gears 2. The remaining portion of the tracks 16 in the selector drums 11 provide no axial displacement, therefore when the pins 15 are in this portion of the track the dog hubs 3 are held substantially at mid position between gears 2 and so are not in engagement with the gear 2, and cut-outs 27 do not align with the gate 26 so axial displacement of the drum 11 is limited to the clearance between the drum edges and the gate 26.

Figure 9:
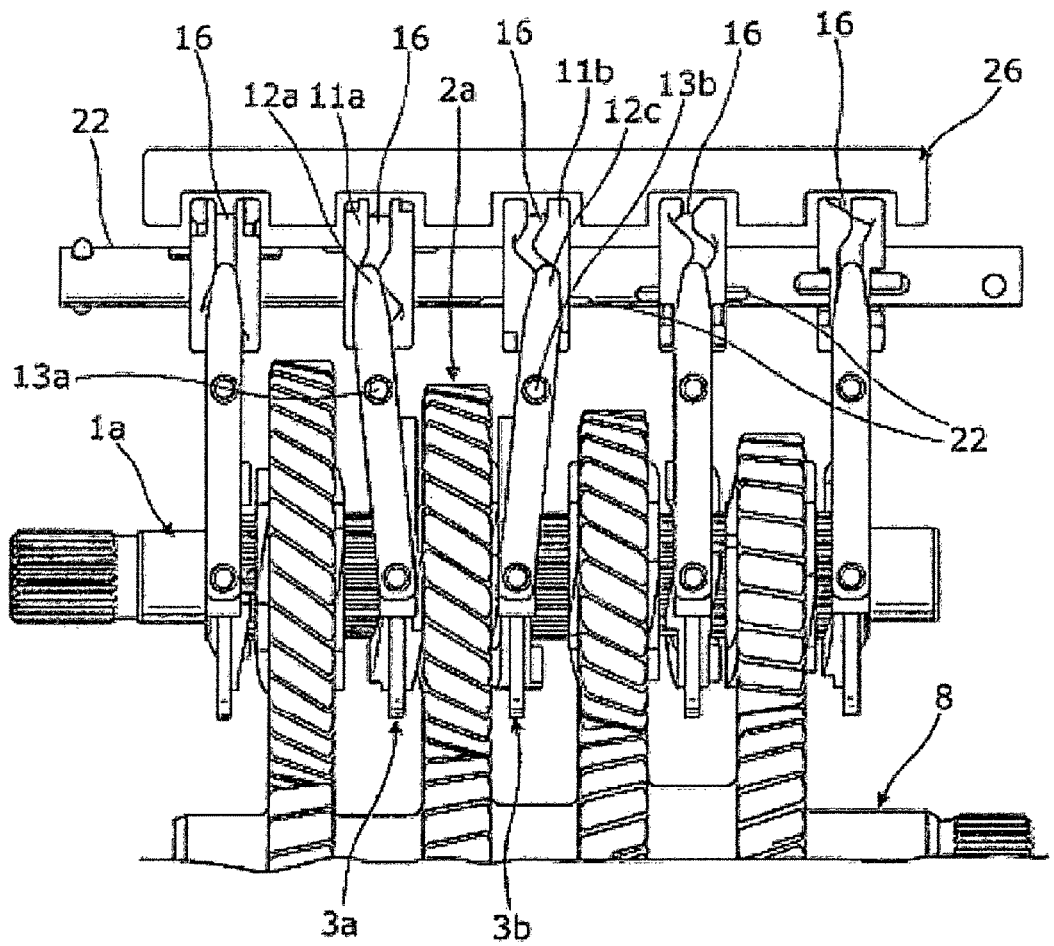
FIG. 9 is a plan view of a 4-ratio gearbox including a related art shifting mechanism shown with one ratio fully engaged.

This shifting mechanism could also be used in other drive member selection assemblies FIG. 9 is a plan view of a 4-ratio gearbox including the heretofore described shifting mechanism, shown with one gear 2 fully engaged. Specifically, dog hubs 3a, and 3b are engaged with gear 2a. The shift shaft 9 is in an angular position where the pins 15a, 15b in tracks 16a and 16b in the selector drums 11a and 11b are displaced axially away from gear 2*a* so that shift arms 12*a* and 12*c* are pivoted around the pivot pins 13*a*, 13*b* to hold the dog hubs 3 in engagement with the gear 2*a*.

The example arrangement as illustrated is configured for use in a conventional engine drive vehicle. For this application the gearbox is assembled so that up shifts are performed with substantially positive torque transmission, (i.e. when the sense of torque at the input shaft is the same as the sense of rotation), and down shifts are performed with substantially negative torque (when the sense of torque at the input shaft is opposite to the sense of rotation). Up shifts are transitions from one gear ratio to another which result in a reduction in input shaft speed for a constant output shaft speed and are normally performed sequentially as the vehicle accelerates. Down shifts are transitions from one gear ratio to another which result in an increase in input shaft speed for a constant output shaft speed and are normally performed sequentially as the vehicle decelerates.

In FIG. 9 it should be noted that the dog features 7 on the right hand faces of each gear 2 and the meshing dog features 7 on the dog hub 3 provide positive driving torque connection between the gear 2 and the shaft and that dog features 7 on the left hand side of each gear 2 provide negative driving torque connection between the gear 2 and the shaft. When the gearbox is transmitting positive torque therefore the dog hub 3*b* on the right hand side of gear 2*a*, as illustrated in FIG. 9, is transmitting torque from the input shaft to the gear 2, the gear 2 then meshing with the lay gear drives the output. It should be noted that when transmitting torque, due to the angled faces of the dog features 7 and the friction in the spline connection between the dog hub 3 and the shaft 1, the dog hub 3 may not readily be moved away from the gear 2 to disengage the gear 2 from the shaft. The preload in the springs 24 on the shift shaft 9 is limited to ensure that disengagement can only occur at relatively low torque levels.

As shown in the fig., however, the dog hub 3*a*, however, when positive torque is being transmitted, is not loaded and so is free to move away from gear 2*a* if so urged by the shifting mechanism.

Figure 10:
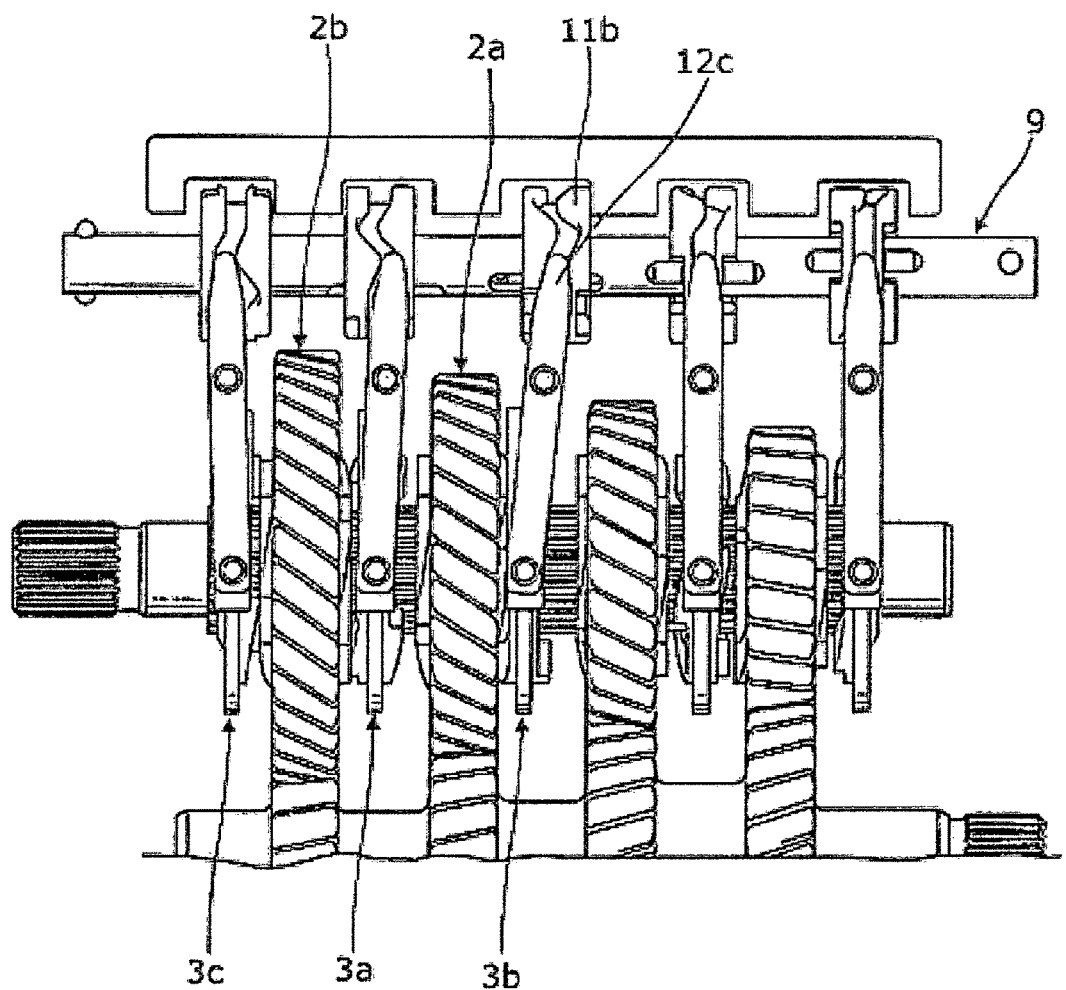
FIG. 10 is a plan view of a 4-ratio gearbox including a related art shifting mechanism shown in the process of making an up shift from third to fourth speed.

FIG. 10 is a plan view of a 4-ratio gearbox including the heretofore described shifting mechanism shown in the process of making an up shift from third to fourth speed. The shift shaft 9 has been rotated fully to the fourth gear position. The dog hub 3*b* is transmitting torque from the input shaft to the gear 2*a* and so is held in engagement. The associated selector drum 11*b* is displaced along the shift shaft 9. Another dog hub 3*c* is being moved towards the gear 2*b* by action of the spring 24 in the shift shaft 9. Since the third gear 2*a* is still engaged, the gear 2*b* is rotating slower than the shaft is and the dog hubs 3, so the ramped faces of the dog features 7 ride up one another to push the dog hub 3*c* away from the gear 2*b* without engagement. The dog hub 3*c* is allowed to move away from the gear 2*b* by compressing the spring 24 inside the shift shaft 9. A further dog hub 3*a* is being moved toward the fourth gear 2*b* by action of the spring 24 inside the shift shaft 9. The dog features 7 between the fourth gear 2*b* and the dog hub 3*a* are positive driving and the main shaft is rotating faster than the fourth gear therefore as the dog hub 3*a* is moved axially towards the gear the leading faces of the dog features 7 contact and positive drive is achieved between the shaft and the gear 2*b*. As drive is picked up by dog hub 3*a*, the load on dog hub 3*b* is relaxed and the gear 2*a* is then rotating faster than the main shaft 1. The ramps on the dog features 7 then will cause the dog hub 3*b* to be pushed away from the gear 2*a* and also the spring 24 in the shift shaft 9 moves the selector drum 11*b* back to the neutral position.

Once the dog hub 3*a* engages with gear 2*b* the main shaft rotates at the same speed as the gear 2*b* therefore dog hub 3*c* is able to move full into engagement with gear 2*b*. Fourth gear is then full engaged and the shifting process is complete.

It should be noted that the shift is achieved by the axial movement of an intermediate dog hub 3, which is between the two gears 2 which are engaged or disengaged. This dog hub 3 is free to move to initiate the shift since it is the negative driving component for the gear 2 being disengaged, and it makes the engagement because it is the positive driving component for the gear 2 which is to be engaged. Once engagement is made by the intermediate dog hub 3 the positive driving dog hub 3 from the earlier selected gear 2 is released and synchronisation is achieved to allow the negative driving dog hub 3 on the gear 2 being engaged to move fully into engagement.

Expressed more generally, if a positive driving selector member is moved toward a drive member of a higher gear, the leading edges of the projections on each are moving towards each other, because of the different gear ratio. When the leading edges contact, drive is picked up by the higher gear drive member and the selector for the lower gear drive member becomes disengaged. Because drive from the lower gear is only disengaged after the drive is picked up by the higher gear, no interruption in torque transmission occurs and the shift may be substantially instantaneous.

Down shifts are completed by the same mechanism of movement of the intermediate gear 2 while negative torque is being transmitted, in the case of a conventional engine driven vehicle this would be when the diver has lifted off the accelerator pedal.

If a down shift is required when positive driving torque is demanded for example if the vehicle is climbing a slope and vehicle speed is falling, a different shifting process is employed. While the gearbox is transmitting positive torque, a single down shift can be pre-selected by rotating the shift shaft 9 to the next lower gear position. The intermediate dog hub 3 is not free to move since it is the positive driving engagement between the gear 2 and the input shaft. The selector drum 11 for the intermediate gear 2 therefore is axially displaced along the shift shaft 9 and the spring 24 inside the shift shaft 9 is further compressed. The negative driving dog hub 3 for the lower gear to be engaged is brought into contact with the gear 2 but it is rotating slower than the gear 2 so it does not engage. To complete the shift, in this example, the driver momentarily reduces or reverses the driving torque to release the intermediate dog hub 3. This is most easily achieved by lifting the accelerator or alternatively by dipping a clutch pedal, if provided. As soon as the torque transmitted through the intermediate dog hub 3 is relaxed the compressed spring 24 in the shift shaft 9 moves the dog hub 3 into engagement with the lower gear, the negative driving dogs engage, the gear 2 and shaft 1 are synchronised and the forward driving dog falls into engagement completing the down shift.

If there exists positive driving torque which holds a dog hub 3 into engagement when more than one down shift is attempted, without allowing the shift to be completed by reducing the torque, there would be, if no steps were taken to prevent it, the possibility that a negative driving dog hub for a lower gear could be engage while the positive driving dog of the other gear is still engaged. This would result in a lock up condition which is likely to cause significant damage to the assembly, but can be addressed as set out below.

Figure 11:
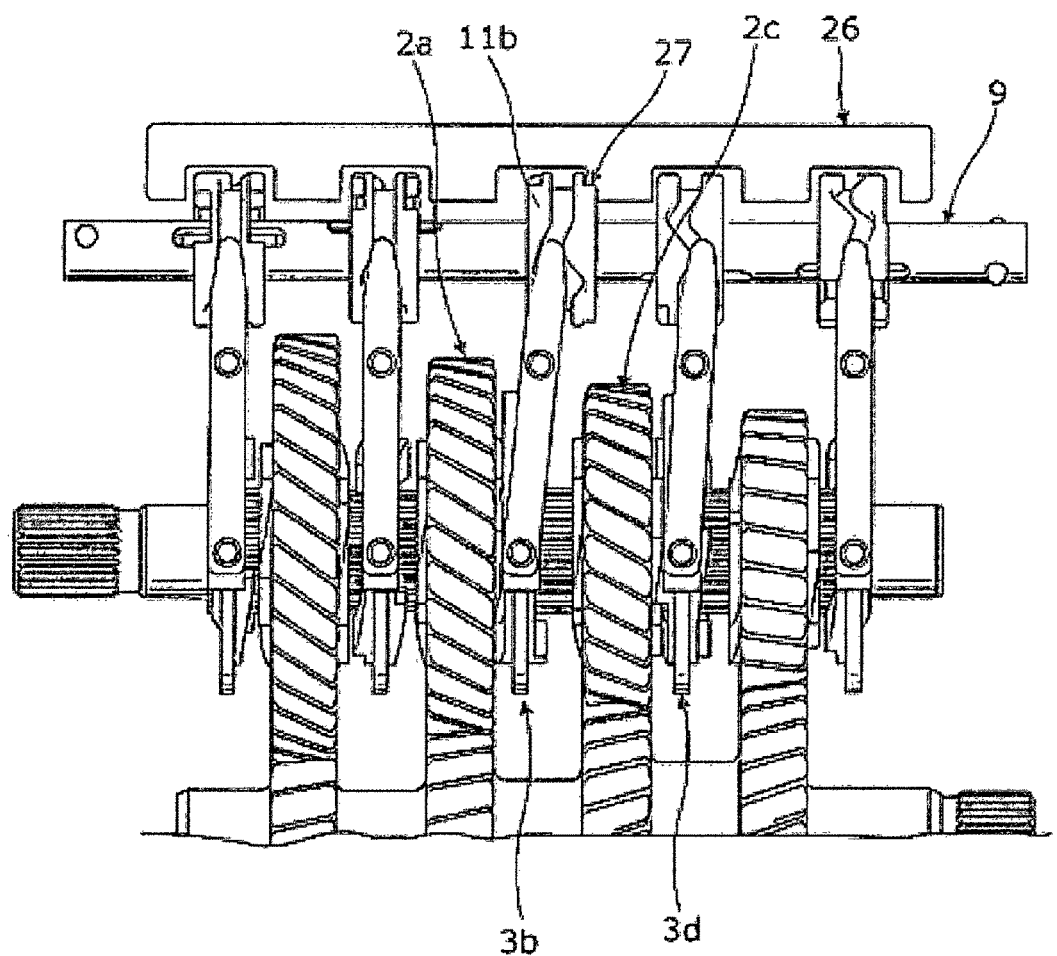
FIG. 11 is a plan view of a 4-ratio gearbox including a related art shifting mechanism shown with a down shift pre-selected while positive driving torque is present.

FIG. 11 is a plan view of a 4-ratio gearbox including the heretofore described shifting mechanism shown with a down shift pre-selected while positive driving torque is present. Dog hub 3*b* is held in engagement with gear 2*a*. Dog hub 3*d* is moved towards gear 2*c* but as the gear 2*c* is rotating faster than the main shaft due to gear 2*a* being still engaged, the reverse driving dog 3*d* does not engage. In this condition the shift shaft 9 has been rotated to a position corresponding to the lower gear being fully engaged. As dog hub 3*b* is held in engagement with gear 2*a* the selector drum 11*b* is displaced along the shift shaft 9 and the cut-out 27 is engaged with the gate 26. The shift shaft 9 can therefore not be rotated further to pre select a second down shift and so a lockup condition is prevented. Similar cut outs are present in both sides of each selector drum 11 and the gate 26 is adjacent to each side of each selector drum 11, therefore pre-selection of more than one up shift while negative torque is transmitted is similarly prevented. The cut-outs 27 therefore prevent the simultaneous engagement by a negative driving dog hub 3 of one gear 2 and a positive driving dog hub 3 of a higher gear 2, and also prevent the simultaneous selection of a positive driving dog hub 3 of one gear 2 and a negative driving dog 3 of a lower gear 2.

The shift shaft 9 in this example must in this embodiment be rotated by a predetermined angle on each shift. For manual operation this is most easily achieved using any form of indexing mechanism familiar to one of ordinary skill in the art for example a ratchet mechanism used for indexing a selector drum in a motor cycle gearbox. Alternatively any form of rotary actuator for example an electric servo motor, a hydraulic servo motor or a pneumatic servo motor could be used.

Electronic or other forms of control system may be used to operate a gear mechanism which could simply take the form of a device to determine when to make a shift and so automating the shifts using a mechanical shifting mechanism of the type heretofore described.

It will be apparent to one of ordinary skill in the art that the heretofore mentioned shifting components and mechanism may be used in many different configurations of gearbox or transmission for any purpose, for example using any number of different selectable gears or with selectable gears mounted on more than one shaft.

Furthermore, it should be noted that a gearbox or any of the components heretofore described may be used in any mechanism requiring the selective coupling of components to shafts. It should also be noted that a gearbox or any of the components described above may be used in conjunction with any rotary power source and rotary load for example in a transmission coupling an electric motor to the wheels of a vehicle. Other examples of rotary power sources which could be used include, but are not limited to, hydraulic motors, pneumatic motors, internal combustion engines and gas turbine engines.

Enhanced or Improved Shifting Mechanism

Some embodiments are described hereafter and concern an improved shifting mechanism for implementing gear ratio shifts. Such embodiments include a different way of coupling selector drums 11 to a shift shaft 9 compared to the manner described in connection with FIG. 8.

Figure 12:
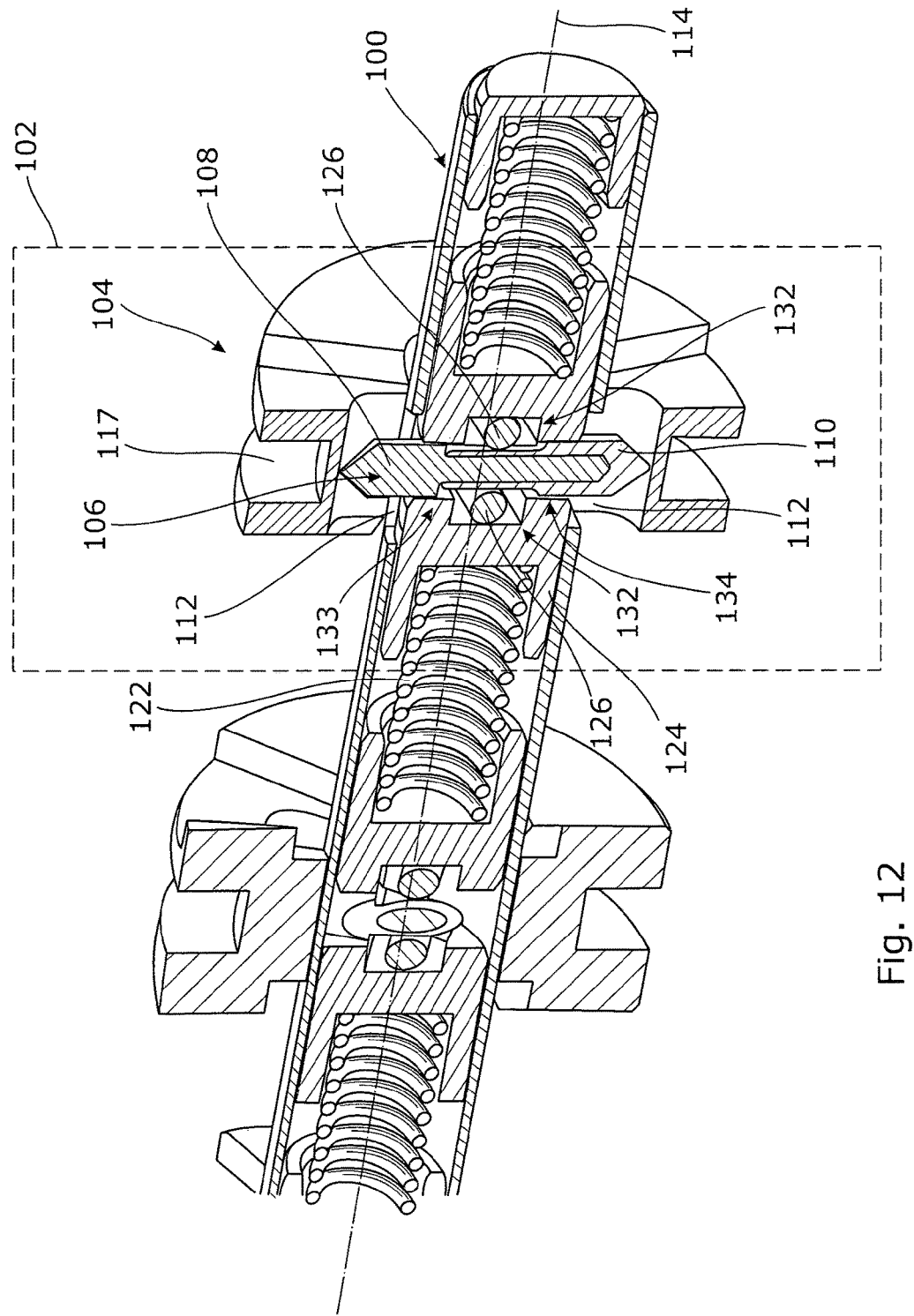
FIG. 12 is cross-sectional view through a shift shaft including multiple shifting features according to an embodiment.

FIG. 12 illustrates a cross-sectional view of a shift shaft 100 provided with multiple shifting features, one of which will now be described in detail.

The shifting feature denoted 102 includes a selector drum 104 that is rotationally coupled to the shift shaft 100 by a multi-part pin 106. The multi-part pin 106 has first and second parts 108, 110; whereby the first part 108 is received inside a recess defined by the second part 110 such that the two parts can be rotated relative to each other. As is more clear from FIG. 13, the multi-part pin 106 protrudes through opposing slots 112 that extend along a parallel direction to the axis 114 defined by the shift shaft 100. More specifically, when assembled each of the first and second parts of the multi-part pin 108, 110 protrude through respective co-axial slots 112 and thus extend away from opposite sides of the shift shaft 102. As will be described in more detail later on, a slight clearance exits along the direction denoted A in FIG. 13 between each of the first and second parts of the multi-part pin 108, 110 and the respective slots 112 through which they extend. The clearance along the direction denoted B however is much greater such that the multi-part pin 106 is able to move along the slots 112.

Looking back at FIG. 12, a selector drum 104 is arranged around the shaft 102. Such a selector drum 104 is illustrated from different angles in FIGS. 14*a* to 14*g*. It defines a bore 118 through which the shift shaft 100 extends when the selector drum 104 is mounted thereon. It also defines a track 117 extending at least partially around its outer surface that is configured for use in the same manner as the track 16 in FIG. 7 heretofore described, specifically to cause movement of a dog hub via a shift arm arrangement; or expressed more generally to cause a drive member selector member provided in operative relation to the track to be urged into and out of driving engagement with a drive member by rotating the shift shaft too.

Additionally the selector drum 104 defines opposing channels 120 which extend entirely through the selector drum 104 along the same direction as the bore 118. The space defined by such channels 120 joins with that defined by the bore 118. When the selector drum 104 is mounted on the shift shaft too, the first and second parts of the multi-part pin 108, 110 extend into these channels 120 respectively. Thus when the shift shaft 100 is rotated torque is transferred to the selector drum 104 by virtue of engagement of the first and second parts of the multi-part pin 108, 110 with a side of each channel 120, each such channel 120 thereby functioning as a key way. As will be described in more detail later on, when assembled a slight clearance exits along the direction denoted C in FIG. 13 between the first and second parts of the multi-part pin 108, 110 and the respective channels 120 into which they extend; this is also illustrated again in FIG. 14*a*.

Figure 15:
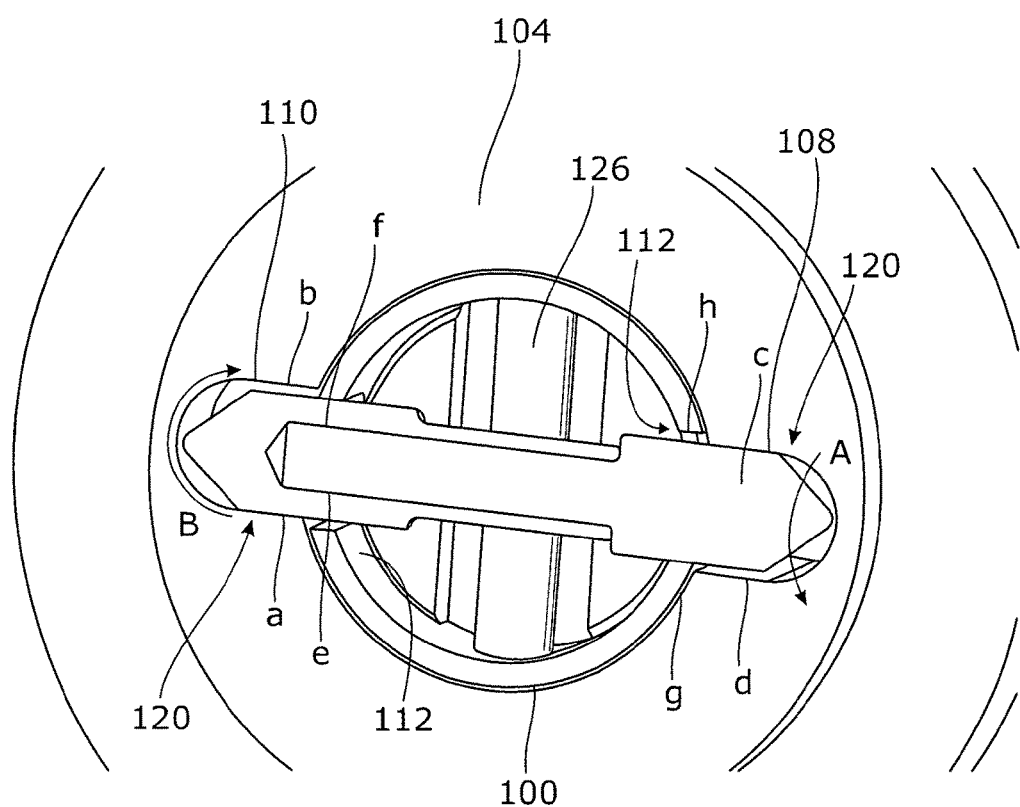
FIG. 15 is a cross-sectional view of the arrangement in FIG. 12 viewed along the length of the shift shaft 100.

FIG. 15 illustrates a cross sectional view through the shifting feature 102 in use. As previously described, the first and second parts of the multi-part pin 108, 110 protrude through opposing co-axial slots 112 in the shift shaft too and are received in opposing co-axial channels 120 defined by the selector drum 104. A gap exists between sides of the slots 112 and the parts of the multi-part pin extending through them, in addition to a gap existing between the channels 120 and the parts of the multi-part pin 106 extending into them. As a result the shift shaft 100 has some rotational freedom and can be rotated by a predetermined amount relative to the selector drum 104 without causing torque to be transferred to the selector drum 104, and the reason for this will now be explained.

Respective sides of the channels 120 in FIG. 15 are denoted a to d and respective sides of the slots 112 are denoted e to h. In essence, when the shift shaft 100 is rotated the edges of the slots 112 and channels 120 that the first and second parts of the multi-part pin 108, 110 are caused to engage differ depending on the direction in which the shift shaft 100 is rotated. For instance, if the shift shaft 100 is rotated anti-clockwise like in FIG. 15, the edges of the shift shaft 100 denoted g and f are moved against the first and second parts of the multi-part pin 108, 110 respectively; whereas the edges of the shift shaft 100 denoted h and e are moved away from the first and second parts of the multi-part pin 108, 110.

When a force is exerted on the first and second parts of the multi-part pin 108, 110 by the aforementioned sides g and f of the slots 112, the respective parts of the multi-part pin are urged into engagement with the sides of the channels 120 denoted c and a; whereas the first and second parts of the multi-part pin 108, 110 are moved away from the sides of the channels 120 denoted d and b.

In other words, when torque is transferred to the selector drum 104 from the shift shaft 100 each of the first and second parts of the multi-part pin 108, 110 are pinched between an edge of the slot 112 through which the respective part extends and a surface of the channel 120 into which the respective part extends.

In view of the foregoing it will be appreciated that if the shift shaft 100 is rotated in the clockwise direction, opposite to that illustrated in FIG. 15, the sides of the of the shift shaft denoted h and e would be urged against the first and second parts of the multi-part pin 108, 110 respectively which would thereby move these parts into engagement with the sides of the channels 120 denoted d and b.

The foregoing enables the first and second parts of the multi-part pin 108, 110 to rotate in opposite directions if the selector drum 104 is caused to move along the length of the shift shaft 100 while a torque is exerted thereon; like what is happening to the drum 11b during an upshift operation described on page 14, lines 10 to 15 herein and also throughout a downshift while positive driving torque is present as described on page 16, lines 16 to 24 herein.

In particular, looking again at FIG. 15, if the selector drum 104 is caused to move along the shift shaft 100 in a direction out of the page, the first part 108 of the multi-part pin will rotate in the direction denoted A but the second part 110 of the multi-part pin will rotate in the opposite direction denoted B. This is due to the respective parts of the multi-part pin 108, 110 being in shear with an edge of the slot 112 and a surface of the channel 120.

If the selector drum 104 is caused to move along the length of the shift shaft 100 while a torque is exerted thereon the selector drum 104 can thus ride along the shift shaft 100 on the multi-part pin 106 as it rolls underneath the selector drum 104. This is different from the prior arrangement shown in FIG. 8 whereby, in a similar situation, the pins 21 would be dragged along edges of the slots 22 in the shift shaft 9 thereby hindering sliding motion of the drum 11 along the shaft 9.

Rotation of the first and second parts of the multi-part pin 108, 110 as described significantly reduces the magnitude of frictional forces resisting movement of the selector drum 104 along the length of the shift shaft 100. This makes it easier to implement gear ratio shifts because less torque is required to be exerted on the shift shaft 100 to implement a gear ratio shift, bearing in mind that some of this torque causes a selector drum 104 to be urged along the shift shaft 100. As a reminder this is because, in some instances, when a selector drum 104 is caused to rotate the shift arms cooperating with the track 117 are essentially locked in place and thus ride up ramped portions of the track 117 as the selector drum 104 rotates. Reaction forces of such shift arms against the track 117 push the selector drum 104 along the shift shaft 100; like what is happening to the drum 11b throughout an upshift operation described on page 14, lines 10 to 15 herein and also throughout a downshift while positive driving torque is present as described on page 16, lines 16 to 24 herein.

In other words, torque exerted on the shift shaft 100 to implement a gear ratio shift causes translational movement of the selector drum 104 along the shift shaft 100. With less friction hindering such translational movement, less torque is needed to be exerted on the shift shaft 100 to implement a gear ratio shift. Reduced friction also reduces the possibility of the mechanism jamming and so not functioning correctly.

Figure 16:
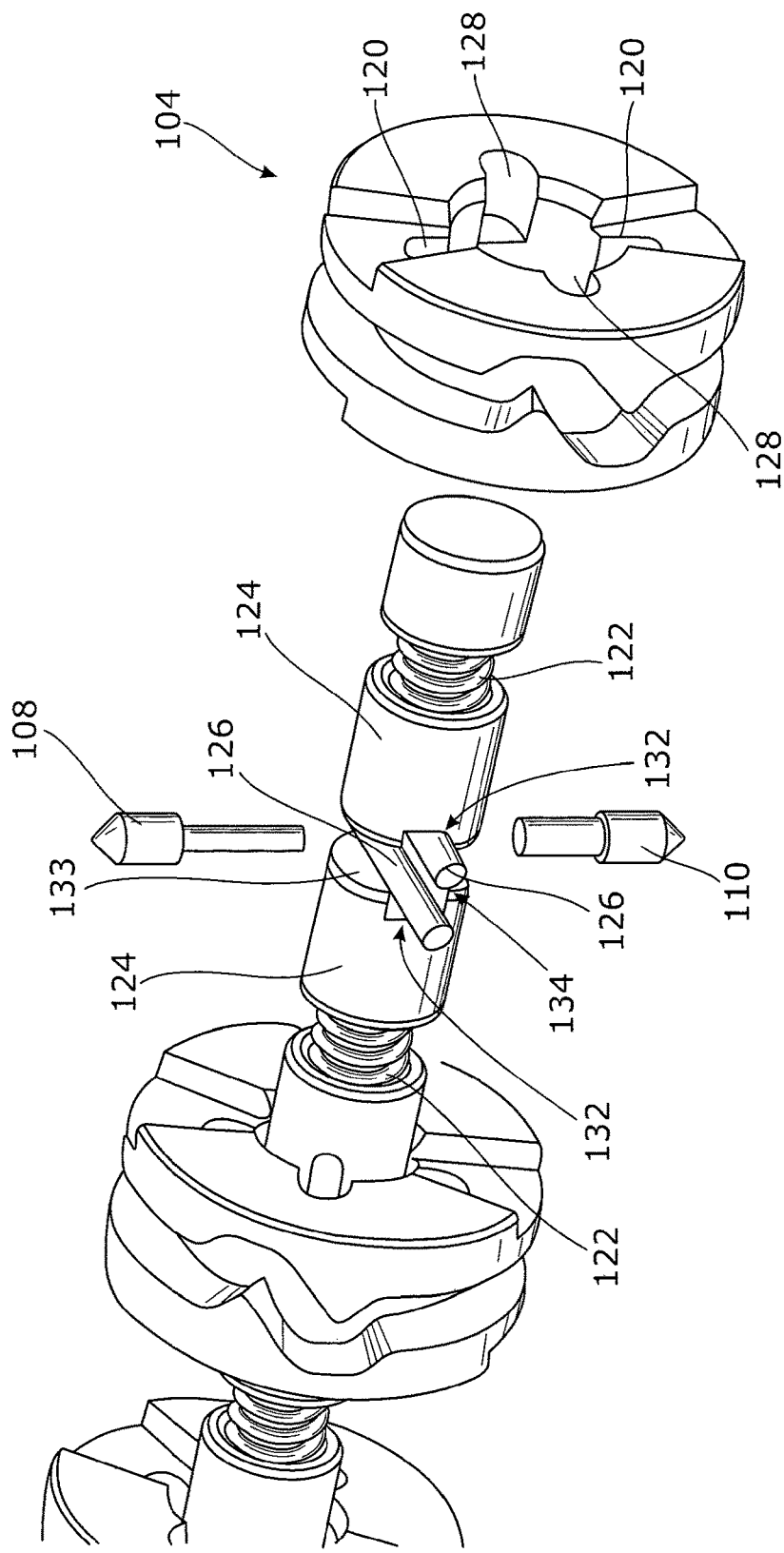
FIG. 16 is another partially exploded view of the arrangement in FIG. 12.

Some additional aspects of the shifting feature denoted 102 in FIG. 12 will now be described. Again, similarly to the arrangement in FIG. 8, the shifting feature 102 includes a biasing mechanism for urging the selector drum 104 towards a rest position along the length of the shift shaft 100. In particular, on each side of the selector drum 104 is provided a resiliently biased feature such as a spring 122. Each such spring 122 urges a spring cup 124 against a pin 126, whereby the pin 126 is received inside a pair of opposing recesses 128 extending into a side of the selector drum 104. When assembled the pins 126 of the biasing mechanism are arranged at substantially 90 degrees relative to the multi-part pin 106. FIG. 16 illustrates the arrangement of features including the biasing mechanism in the absence of the shift shaft 100 and how such features function will now be explained in more detail.

Figure 13:
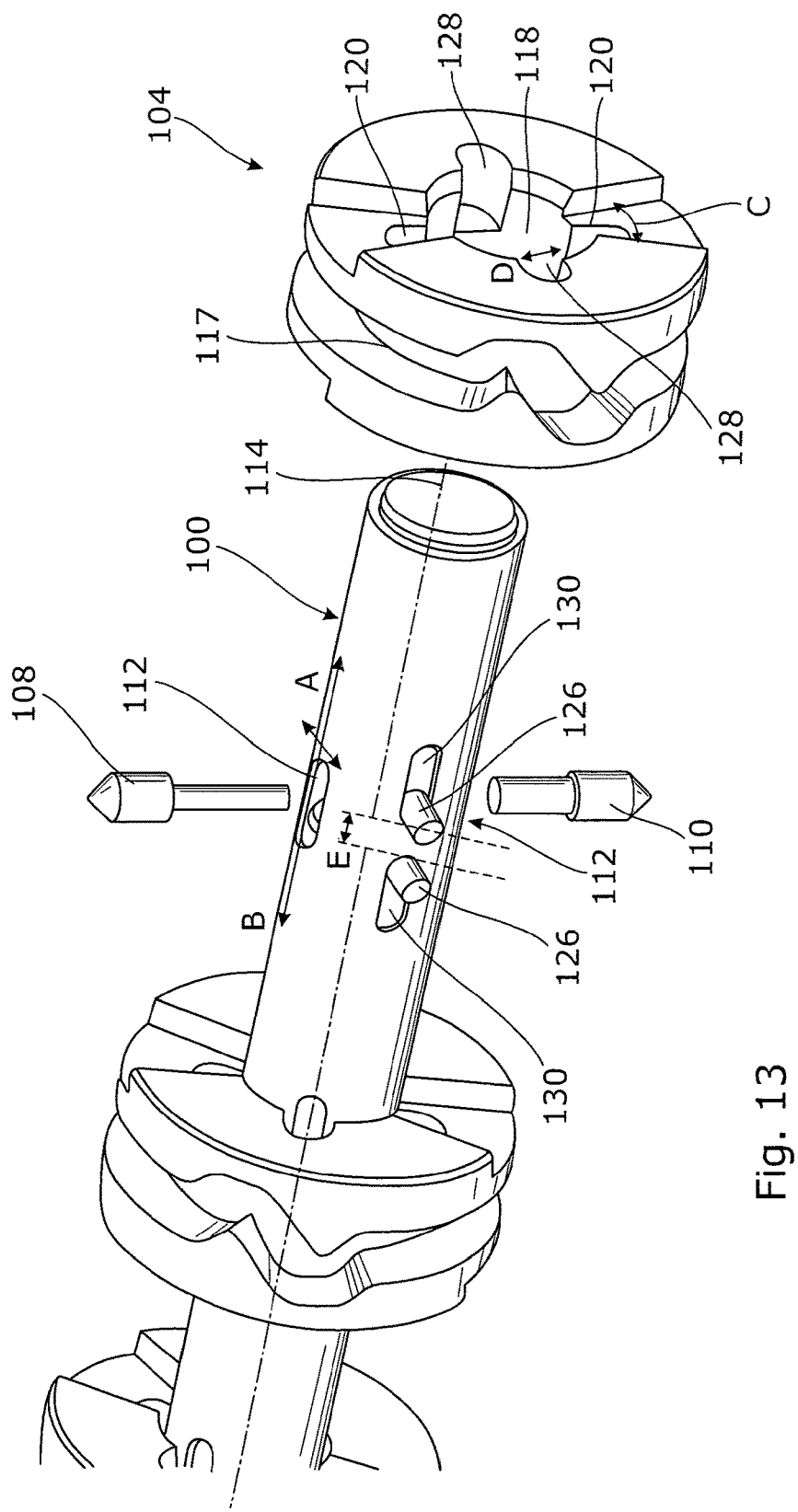
FIG. 13 is a partially exploded view of the arrangement in FIG. 12.

Looking back at FIG. 13, the pins 126 protrude through additional slots extending along the length of the shift shaft 100. In particular, the pin 126 on the left in FIG. 13 extends through a first axially extending slot 130 on one side of the shift shaft 100 and an opposing axially extending slot on the opposite side of the shift shaft 100. Furthermore, the pin 126 on the right in FIG. 13 also extends through a first axially extending slot 130 on one side of the shift shaft 100 and an opposing axially extending slot on the opposite side of the shift shaft 100. The slots 130 including the first pair through which the pin 126 on the left in FIG. 13 extends are co-axial with the slots 130 including the second pair through which the other pin 126 extends.

The pins 126 can move along the lengths of the respective slots 130 through which they extend. Regarding the clearance between each of the pins 126 and sides of the recesses 128 along the direction denoted D in FIGS. 13 and 14a, this clearance should be greater than the heretofore described clearance existing between the first and second parts 108, 110 of the multi-part pin and the sides a, b, c, d of the channels 120 in which they are received. In other words, the clearance along the direction D in FIG. 14a between the pins 126 and recesses 128 is bigger than the clearance along the direction C between the multi-part pin 106 and the channels 120.

In some arrangements the width of the pins 126 is approximately 3 mm and that of the recesses 128 along the direction D is approximately 5 mm.

The diameter of the first and second parts of the multi-part pin 106 and the width of the channels 120 along the direction denoted C in FIG. 13 are nominally the same with only a small difference to create a clearance to allow assembly and allow the multi-part pin 106 to roll within the channels 120 but to maintain angular alignment of the selector drum 104 relative to the shift shaft 100.

In some arrangements the width of the first and second parts of the multi-part pin 106 received in the channels 120 is 0.1 mm less than that of the channels 120 along the direction denoted C in FIG. 13.

The above provides that torque is not transferred to the selector drum 104 by the pins 126 of the biasing mechanism when the shift shaft 100 is rotated but only by the multi-part pin 106.

Figure 14:
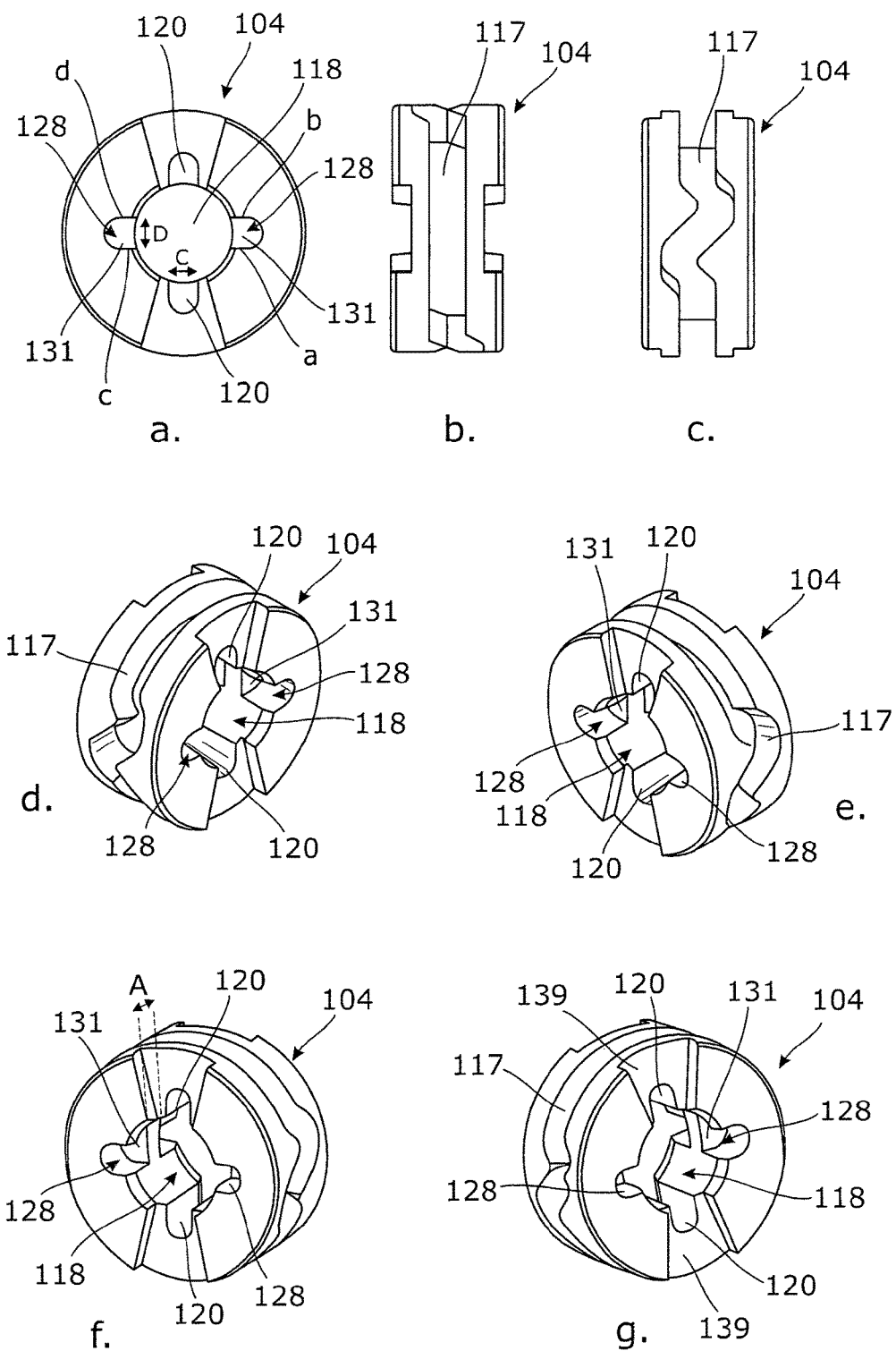
FIGS. 14a to 14g illustrates a selector drum 104 from various angles.

The nature of the recesses 128 extending into sides of the selector drum 104 in which the pins 126 of the biasing mechanism are received will now be explained. As shown in FIG. 14, each side of the selector drum 104 includes a pair of opposing recesses 128 which extend similar distances into the selector drum 104 along the same direction as the bore 118. The opposing recesses 128 on each side of the selector drum 104 each terminate in a ledge 131 which defines a face against which a pin 126 of the biasing mechanism can be forced. Furthermore, the recesses 128 extending into opposite sides of the selector drum 104 are co-axial with each other. As a result the distance between adjacent ledges 131 (denoted A in FIG. 14f) is substantially similar to the distance between adjacent ends of the slots 130 including the aforementioned first and second pairs thereof (denoted E in FIG. 13). Thus when the pins 126 of the biasing mechanism are pushed against adjacent ends of the slots 130 like in FIG. 13 they will urge against the respective faces defined by the ledges 131 inside the recesses 128 and hold the selector drum 104 in the so-called rest position.

Referring back to FIG. 12 if the selector drum 104 is caused to move leftwards along the shift shaft 100 for example, the pin 126 on the left of the selector drum 104 will slide along the slots 130 through which it extends and compress the spring 122. Thus when the axial force urging the selector drum 104 to the left along the shift shaft 100 is removed the spring 122 will push the pin 126 back into engagement with the end of the slot 130, thereby returning the selector drum 104 to its rest position. A similar instance occurs if the selector drum 104 is urged rightwards along the shift shaft 100.

The aforementioned spring cups 124 located between the springs 122 and pins 126 of the biasing mechanism each extend partially around the spring 122 and pins 126 they are respectively in engagement with. More specifically the spring cups 124 each define a slot 132 in their end face for receiving the pins 126 (as shown in FIGS. 12 and 16). First and second parts of the end face 133, 134 that are separated by such slots 132 engage the multi-part pin 106 when the selector drum 104 is in the aforementioned rest position, which is the case illustrated in FIG. 12. This provides that the multi-part pin 106 is held at approximately the middle of the selector drum 104 and substantially perpendicular to the shift shaft 100 when the selector drum 104 is in the rest position.

It is here again stated that due to the selector drum 104 being able to ride on the multi-part pin 106 it easier to implement gear ratio shifts in a gear box of the type described in WO2014/049317 A1 modified such that in the shifting mechanism thereof, selector drums are mounted to a shift shaft in a manner according to some embodiments. In the case of a vehicle including such a modified gearbox, it will be easier to downshift to neutral with the clutch dipped while the engine is idling.

Furthermore, recesses 139 in the end faces of the selector drum 104 (see FIG. 14g) correspond with the cut-outs 27 described in connection with FIG. 7 and are thus configured to interact with gates 26 of the type illustrated in FIG. 7 in use.

It will be appreciated that whilst various aspects and embodiments of the presently disclosed subject matter have heretofore been described, the scope of the presently disclosed subject matter is not limited to the embodiments set out herein and instead extends to encompass all arrangements, and modifications and alterations thereto, which fall within the spirit and scope of the appended claims.

For instance the multi-part pin 106 may include more than two parts. First and second parts of the multi-part pin 106, capable of being rotated relative to each other, could be coupled by at least one additional multi-part pin feature. As an example the multi-part pin 106 could include a central component about which first and second parts thereof could rotate. Such a three part pin could include two identical drilled pin sections with a smaller diameter pin inserted between to provide a locating feature. It will however be appreciated that various suitable versions of a multi-part pin will be apparent to persons with ordinary skill in art upon reading the present disclosure.

Although the pins 126 of the biasing mechanism have been described as being substantially 90 degrees relative to the multi-part pin 106, this is not necessarily essential. In some embodiments one or both of these pins 126 may be arranged at another angle relative to the multi-part pin, in which case the recesses 128 in the selector drum 104 and slots 130 through which the pins 126 extend would have a different arrangement to that heretofore described. Furthermore the pins 126 of the biasing mechanism need not necessarily be arranged to be in alignment and may be arranged at different angles relative to each other.

The invention claimed is:

1. A shifting apparatus, comprising:
a shaft extending along an axis; and
at least one shifting feature, each of the at least one shifting feature including:
a multi-part pin having first and second parts arranged to rotate relative to each other that extend through respective slots extending along the shaft;
a drum arranged around the shaft and having channels extending along the length thereof in which the first and second parts of the multi-part pin are respectively received for enabling torque to be transferred to the drum when the shaft is rotated, the drum also defining a track at least partially around its outer surface;
a biasing mechanism for urging the drum towards a rest position along the length of the shaft; and
a drive member selector member provided in operative relation to the track, wherein the drive member selector member can be controlled to selectively engage a drive member, for transferring torque thereto in use, by rotating the shaft.

2. The apparatus of claim 1, configured such that when torque is transferred to the drum from the shaft and an axial force is applied to the drum that overcomes the biasing mechanism the drum moves along the shaft by riding on the multi-part pin.

3. The apparatus of claim 2, configured such that when torque is transferred to the drum from the shaft each of the first and second parts of the multi-part pin are pinched between an edge of the slot through which the respective part extends and a surface of the channel into which the respective part extends.

4. The apparatus of claim 3 configured such that as the drum moves along the shaft each of the first and second parts of the multi-part pin are in shear with an edge of the slot through which the respective part extends and a surface of the channel into which the respective part extends.

5. The apparatus of claim 3, configured such that the first and second parts of the multi-part pin rotate in opposite directions as the drum moves along the shaft.

6. The apparatus of claim 3, configured such that the shaft can be rotated by a predetermined amount relative to the drum without causing torque to be transferred to the drum.

7. The apparatus of claim 2, configured such that the shaft can be rotated by a predetermined amount relative to the drum without causing torque to be transferred to the drum.

8. The apparatus of claim 2 configured such that as the drum moves along the shaft each of the first and second parts of the multi-part pin are in shear with an edge of the slot through which the respective part extends and a surface of the channel into which the respective part extends.

9. The apparatus of claim 8, configured such that the first and second parts of the multi-part pin rotate in opposite directions as the drum moves along the shaft.

10. The apparatus of claim 2, configured such that the first and second parts of the multi-part pin rotate in opposite directions as the drum moves along the shaft.

11. The apparatus of claim 1, configured such that the shaft can be rotated by a predetermined amount relative to the drum without causing torque to be transferred to the drum.

12. The apparatus of claim 11, wherein a clearance exists between sides of the slots through which, and sides of the channels into which, the first and second parts of the multi-part pin respectively extend.

13. The apparatus of claim 1, wherein one of the first and second parts of the multi-part pin is received inside the other.

14. The apparatus of claim 1, wherein the first and second parts of the multi-part pin are coupled by at least one additional multi-part pin feature.

15. The apparatus of claim 14, wherein the multi-part pin includes a third part about which the first and second parts can rotate.

16. The apparatus of claim 1, wherein the biasing mechanism includes two pins urged into recesses on opposite sides of the drum, and wherein the apparatus is configured such that torque is not transferred to the drum by such pins when the shaft is rotated.

17. The apparatus of claim 16, wherein each of the pins is urged by a respective resiliently biased member which partially extends around the pin.

18. The apparatus of claim 17, wherein the resiliently biased members extending around the respective pins maintain the multi-part pin substantially perpendicular with the axis extending along the length of the shaft when the drum is located in the rest position.

19. The apparatus of any claim 16, wherein the pins are arranged at substantially 90 degrees relative to the multi-part pin.

20. A gearbox, comprising:
the shifting apparatus according to claim 1.

* * * * *